(12) United States Patent
Han et al.

(10) Patent No.: US 9,311,713 B2
(45) Date of Patent: Apr. 12, 2016

(54) ESTIMATOR TRAINING METHOD AND POSE ESTIMATING METHOD USING DEPTH IMAGE

(71) Applicants: SAMSUNG ELECTRONICS CO., LTD., Suwon-si, Gyeonggi-do (KR); IMPERIAL INNOVATIONS LTD., London (GB)

(72) Inventors: Jae Joon Han, Seoul (KR); Danhang Tang, London (GB); Tae Kyun Kim, London (GB); Seung Ju Han, Seoul (KR); Byung In Yoo, Seoul (KR); Chang Kyu Choi, Sungnam-si (KR); Alykhan Tejani, London (GB); Hyung Jin Chang, Daejeon (KR)

(73) Assignees: SAMSUNG ELECTRONICS CO., LTD., Suwon-si (KR); IMPERIAL INNOVATIONS LTD., London (GB)

(*) Notice: Subject to any disclaimer, the term of this patent is extended or adjusted under 35 U.S.C. 154(b) by 3 days.

(21) Appl. No.: 14/283,646

(22) Filed: May 21, 2014

(65) Prior Publication Data

US 2014/0363047 A1 Dec. 11, 2014

Related U.S. Application Data

(63) Continuation of application No. 14/280,990, filed on May 19, 2014.

(60) Provisional application No. 61/831,255, filed on Jun. 5, 2013.

(30) Foreign Application Priority Data

Oct. 31, 2013 (KR) .......................... 10-2013-0131658

(51) Int. Cl.
- *G06T 7/00* (2006.01)
- *G06K 9/00* (2006.01)
- *G06K 9/62* (2006.01)

(52) U.S. Cl.
CPC .......... *G06T 7/0046* (2013.01); *G06K 9/00382* (2013.01); *G06K 9/00389* (2013.01);
(Continued)

(58) Field of Classification Search
None
See application file for complete search history.

(56) References Cited

U.S. PATENT DOCUMENTS 5,930,392 A * 7/1999 Ho ................................. 382/224
7,660,705 B1 * 2/2010 Meek et al. ....................... 703/2
(Continued)

FOREIGN PATENT DOCUMENTS

| JP | 2009-104569 A | 5/2009 |
| KR | 10-2012-0020045 A | 3/2012 |
| KR | 10-2012-0082126 A | 7/2012 |

OTHER PUBLICATIONS

Choi, Myung Jin, et al. "Consistent and efficient reconstruction of latent tree models." Communication, Control, and Computing (Allerton), 2010 48th Annual Allerton Conference on. IEEE, 2010.*

(Continued)

*Primary Examiner* — Kim Vu
*Assistant Examiner* — Nathan Bloom
(74) *Attorney, Agent, or Firm* — NSIP Law

(57) ABSTRACT

An estimator training method and a pose estimating method using a depth image are disclosed, in which the estimator training method may train an estimator configured to estimate a pose of an object, based on an association between synthetic data and real data, and the pose estimating method may estimate the pose of the object using the trained estimator.

16 Claims, 25 Drawing Sheets

(52) U.S. Cl.
CPC .............. *G06K9/627* (2013.01); *G06K 9/6219* (2013.01); *G06K 9/6256* (2013.01); *G06K 9/6259* (2013.01); *G06K 9/6282* (2013.01); *G06K 2209/05* (2013.01); *G06T 2207/10028* (2013.01); *G06T 2207/20081* (2013.01); *G06T 2207/30196* (2013.01)

(56) References Cited

U.S. PATENT DOCUMENTS

| | | | |
|---|---|---|---|
| 2008/0285860 A1* | 11/2008 | Datta et al. ............... | 382/224 |
| 2011/0262002 A1 | 10/2011 | Lee | |
| 2011/0268177 A1 | 11/2011 | Tian et al. | |
| 2012/0225719 A1* | 9/2012 | Nowozin et al. ............ | 463/36 |
| 2013/0101177 A1 | 4/2013 | Yamada et al. | |
| 2014/0204013 A1* | 7/2014 | O'Prey et al. ............... | 345/156 |
| 2015/0054729 A1* | 2/2015 | Minnen et al. ............... | 345/156 |
| 2015/0077326 A1* | 3/2015 | Kramer et al. ............... | 345/156 |

OTHER PUBLICATIONS

Badami, Ishrat, Jörg Stückler, and Sven Behnke. "Depth-Enhanced Hough Forests for Object-Class Detection and Continuous Pose Estimation." 3rd Workshop on Semantic Perception, Mapping and Exploration (SPME), collocated with ICRA 2013. May 5, 2013.*

Choi, Myung Jin, et al. "Learning latent tree graphical models." The Journal of Machine Learning Research 12 (2011): 1771-1812.*

Wang, Fang, and Yi Li. "Beyond physical connections: Tree models in human pose estimation." Computer Vision and Pattern Recognition (CVPR), 2013 IEEE Conference on. IEEE, May 10, 2013.*

Tian, Yuandong, C. Lawrence Zitnick, and Srinivasa G. Narasimhan. "Exploring the spatial hierarchy of mixture models for human pose estimation." Computer Vision—ECCV 2012. Springer Berlin Heidelberg, Oct. 7, 2012. 256-269.*

Leandro Cruz et al., Kinect and RGBD Images: Challenges and Applications, Rio de Janeiro, Brazil.

Athitsos, V. et al. "3D Hand Pose Estimation by Finding Appearance-Based Matches in a Large Database of Training Views." IEEE Workshop on Cues in Communication. Jan. 1, 2001. XP055185213. URL:https://open.bu.edu/bitstream/handle/2144/1642/2001-021-handpose-estimation.pdf?sequence=1. Retrieved Apr. 22, 2015. (14 pages, in English).

Shotton, Jamie, et al. "Real-Time Human Pose Recognition in Parts from Single Depth Images." 2001 IEEE Conference on Computer Vision and Pattern Recognition (CVPR). XP032037818. Jun. 20, 2011.: 1297-1304.

Sung, Jaeyong, et al. "Human Activity Detection from RGBD Images." Workshop at the 25$^{th}$ AAAI Conference on Artificial Intelligence (AAAI-11). Aug. 7-11, 2011. (8 pages, in English).

Gall, Juergen, et al. "Hough Forests for Object Detection, Tracking, and Action Recognition." IEEE Transactions on Pattern Analysis and Machine Intelligence. vol. 33. No. 11. Nov. 1, 2011.: 2188-2202.

Keskin, Cem, et al. "Real Time Hand Pose Estimation Using Depth Sensors." 2011 IEEE International Conference on Computer Visions Workshops (ICCV Workshops). IEEE. XP032095388. Nov. 6, 2011.: 1228-1234.

Richtsfeld, Andreas, et al. "Towards Scene Understanding—Object Segmentation Using RGBD—Images." 17$^{th}$ Computer Vision Winter Workshop (CVWW). Feb. 1-3, 2012. (8 pages, in English).

Ly, Daniel L., et al. "Co-Evolutionary Predictors for Kinematic Pose Inference from RGBD Images." Proceedings of the 14th Annual Conference on Genetic and Evolutionary Computation (GECCO). ACM. Jul. 7-11, 2012. (8 pages, in English).

Extended European Search Report mailed May 6, 2015 in counterpart European Application No. 14171067.3 (7 pages, in English).

* cited by examiner

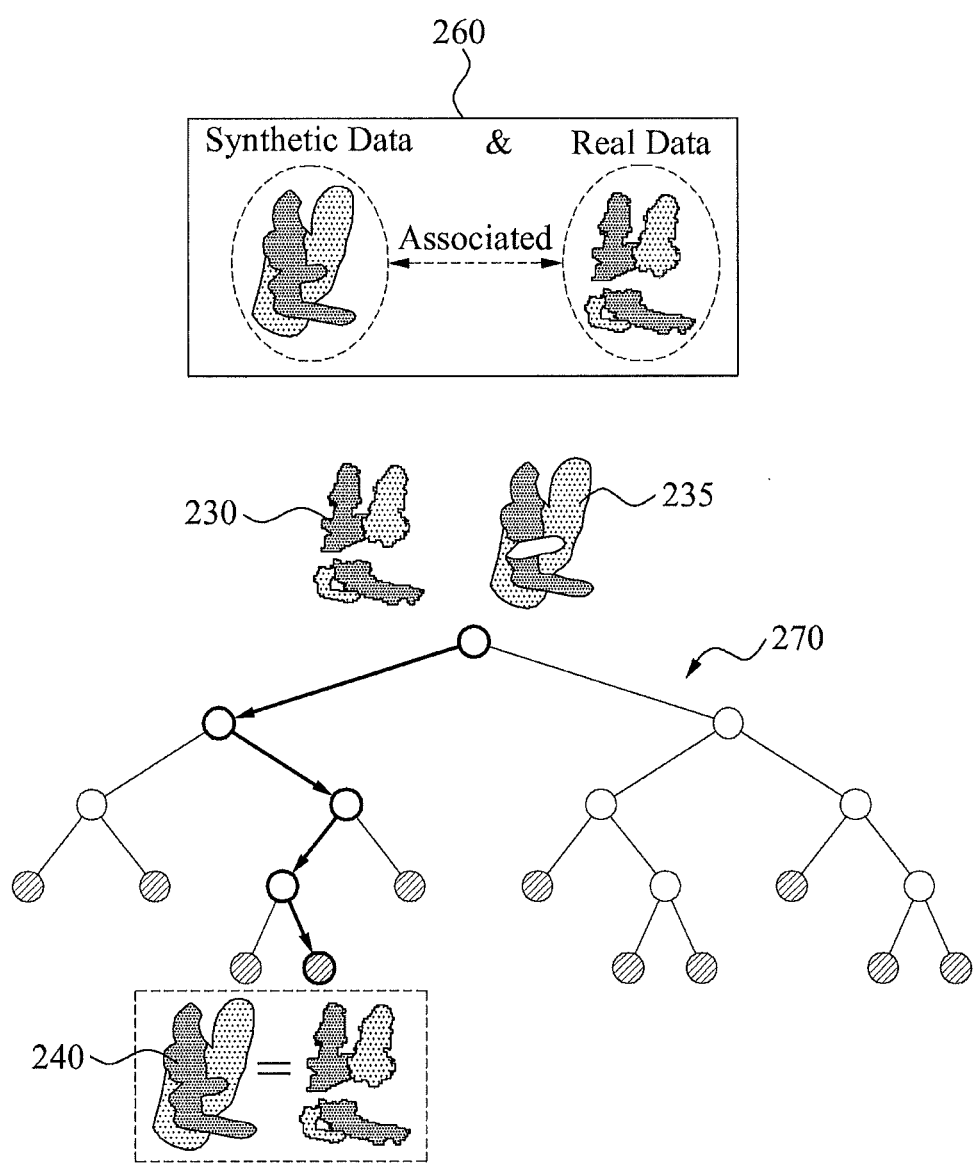

Latent tree model

ESTIMATOR TRAINING METHOD AND POSE ESTIMATING METHOD USING DEPTH IMAGE

CROSS-REFERENCE TO RELATED APPLICATIONS

This application is a continuation of U.S. application Ser. No. 14/280,990 filed May 19, 2014, which claims the benefit of U.S. Provisional Application No. 61/831,255, filed on Jun. 5, 2013, in the U.S. Patent and Trademark Office, and Korean Patent Application No. 10-2013-0131658, filed on Oct. 31, 2013, in the Korean Intellectual Property Office, the disclosures of which are incorporated herein by reference.

BACKGROUND

1. Field

One or more example embodiments of the following description relate to a scheme of estimating a pose of an object using a depth image.

2. Description of the Related Art

A depth image includes information regarding a distance from a vision sensor to an object. A plurality of pixels included in the depth image each include distance information from a projected plane of the vision sensor to a part of the object corresponding to each respective pixel. The depth image may include noise or holes generated by various factors. For example, a limited resolution of the vision sensor may cause a great deal of noise in the depth image. In addition, data in a predetermined pixel in the depth image may be omitted depending on an operating scheme of the vision sensor configured to photograph the depth image. In this example, the depth image may include a hole at a corresponding location.

A time-of-flight (TOF) vision sensor may calculate a distance between the vision sensor and an object based on a period of time taken for light output from the vision sensor to reach the object, to be reflected, and to subsequently return to the vision sensor. However, in a case of an object tilted with respect to a projected plane of the vision sensor, a light output from the vision sensor may be reflected in a direction different from an incident direction. A depth image may include a hole at a corresponding location because the vision sensor may not receive the light reflected in the direction different from the incident direction.

A structured-light vision sensor may calculate a distance between the vision sensor and an object by outputting a pattern including a plurality of points and sensing distances among the plurality of points projected on the object. However, when a single point is projected on a predetermined part of the object, a distance between the vision sensor and a corresponding location may not be calculated, and a depth image may include a hole at the corresponding location.

SUMMARY

The foregoing and/or other aspects are achieved by providing a method of training an estimator, the method including associating synthetic data in which an object including joints is synthesized, with real data in which the object is photographed, and training the estimator configured to estimate a pose of the object, based on an association between the synthetic data and the real data.

The training may include generating a node to branch the mutually associated synthetic data and real data in an identical direction, and generating a decision tree using the node.

The associating may include comparing a joint location corresponding to a first datapoint included in the synthetic data to a joint location corresponding to a second datapoint included in the real data, and determining that the first datapoint is associated with the second datapoint when the joint locations match.

The training may include generating a node to determine a branching direction of data input into the estimator, based on the association and an appearance similarity indicating whether appearances corresponding to datapoints are similar, and generating a decision tree using the node.

The training may include selecting, at random, one of a first evaluation function using the association and an appearance similarity between first datapoints and a second evaluation function using a view similarity, a class similarity, and a vector similarity between second datapoints, generating a node to determine a branching direction of data input into the estimator using the selected evaluation function, and generating a decision tree using the node.

The training may include selecting, at random, one of an appearance similarity, a view similarity, a class similarity, and a vector similarity between datapoints included in one of the association, the synthetic data, and the real data, generating a node to determine a branching direction of data input into the estimator based on the selected similarity, and generating a decision tree using the node.

The foregoing and/or other aspects are achieved by providing a method of estimating a pose, the method including obtaining a plurality of vector sets corresponding to a plurality of patches included in an input image using an estimator trained based on an association between synthetic data in which an object including joints is synthesized and real data in which the object is photographed, and estimating a pose of an input object included in the input image based on the plurality of vector sets.

The estimating may include generating a plurality of 2-part Gaussian mixture models (GMMs) corresponding to a plurality of joints included in the input object based on the plurality of vector sets, and calculating three-dimensional (3D) coordinates of the plurality of joints included in the input object based on the plurality of 2-part GMMs.

The foregoing and/or other aspects are achieved by providing an apparatus for training an estimator, the apparatus including an association unit configured to associate synthetic data in which an object including joints is synthesized, with real data in which the object is photographed, and a learner configured to learn the estimator configured to estimate a pose of the object, based on an association between the synthetic data and the real data.

The foregoing and/or other aspects are achieved by providing an apparatus for estimating a pose, the apparatus including an obtainer configured to obtain a plurality of vector sets corresponding to a plurality of patches included in an input image using an estimator trained based on an association between synthetic data in which an object including joints is synthesized and real data in which the object is photographed, and an estimation unit configured to estimate a pose of an input object included in the input image based on the plurality of vector sets.

The foregoing and/or other aspects are achieved by providing a method of training an estimator configured to estimate a pose of an object including joints, the method including obtaining a latent tree model of the object, and generating a vector pair configured to partition input data received at a latent node into two parts, with respect to a plurality of latent nodes positioned along paths from a root node to a plurality of leaf nodes of the latent tree model.

The foregoing and/or other aspects are achieved by providing a method of estimating a pose, the method including detecting a plurality of parts of an input object included in an input image using an estimator trained based on a latent tree model of an object including joints, and estimating a pose of the input object based on the detected plurality of parts.

The foregoing and/or other aspects are achieved by providing a method of training an estimator, the method including obtaining real object data from an input image of an object, independently generating synthetic object data using a model of the object, associating the synthetic object data with the real object data, and training, by way of a processor, the estimator to estimate a pose of the object based on the associating of the synthetic object data and the real object data.

Additional aspects of example embodiments will be set forth in part in the description which follows and, in part, will be apparent from the description, or may be trained by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
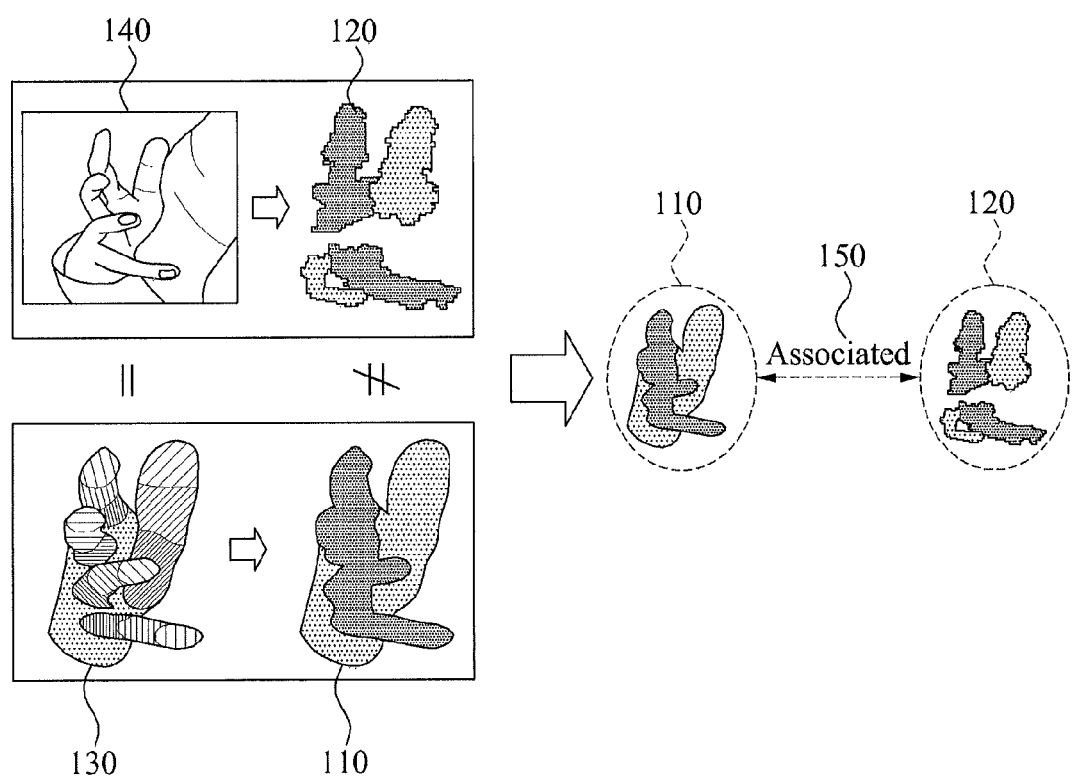
FIGS. 1 through 4 illustrate a scheme of estimating a pose based on both synthetic data and real data according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

Overview of Pose Estimating Scheme

FIGS. 1 through 4 illustrate a scheme of estimating a pose according to example embodiments. The pose estimating scheme may estimate a pose of an articulated object. The term "articulated object" may refer to an object including joints, and may include, for example, a hand of a user, any other body part of the user, or an entire body of the user. In the pose estimating scheme, the pose of the articulated object may be estimated using a depth image.

Referring to FIG. 1, both synthetic data 110 in which a hand of a user is synthesized and real data 120 in which the hand of the user is photographed may be used. The synthetic data 110 may be generated from a model 130 of an articulated object. The model 130 of the articulated object may include three-dimensionally (3D)-modeled information of poses performable by the articulated object based on a structure of joints included in the articulated object. The real data 120 may include an output image of a vision sensor used to photograph an actual articulated object 140. The synthetic data 110 and the real data 120 may respectively include depth image data.

When an estimator configured to estimate a pose of an articulated object is trained using the real data 120, incalculable resources may be used to train the estimator due to the vast amount of the real data 120. The real data 120 may vary as a viewpoint at which the actual articulated object 140 is photographed or a pose of the actual articulated object 140 changes. For example, when estimating a pose of a hand of a user, although the hand of the user is identically posed, different images may be output depending on a viewpoint at which a vision sensor sensing the hand of the user views the posed hand of the user. In addition, since the estimator may be trained for individual cases, labeling may be performed for the individual cases and substantial resources may be used to perform the labeling. Here, the labeling refers to an operation of mapping a result of estimating performed by the estimator to a pose. Data obtained by performing the labeling may be referred to as labeled data. The labeled data may include, for example, information on locations of a plurality of joints included in the articulated object.

Figure 2A:
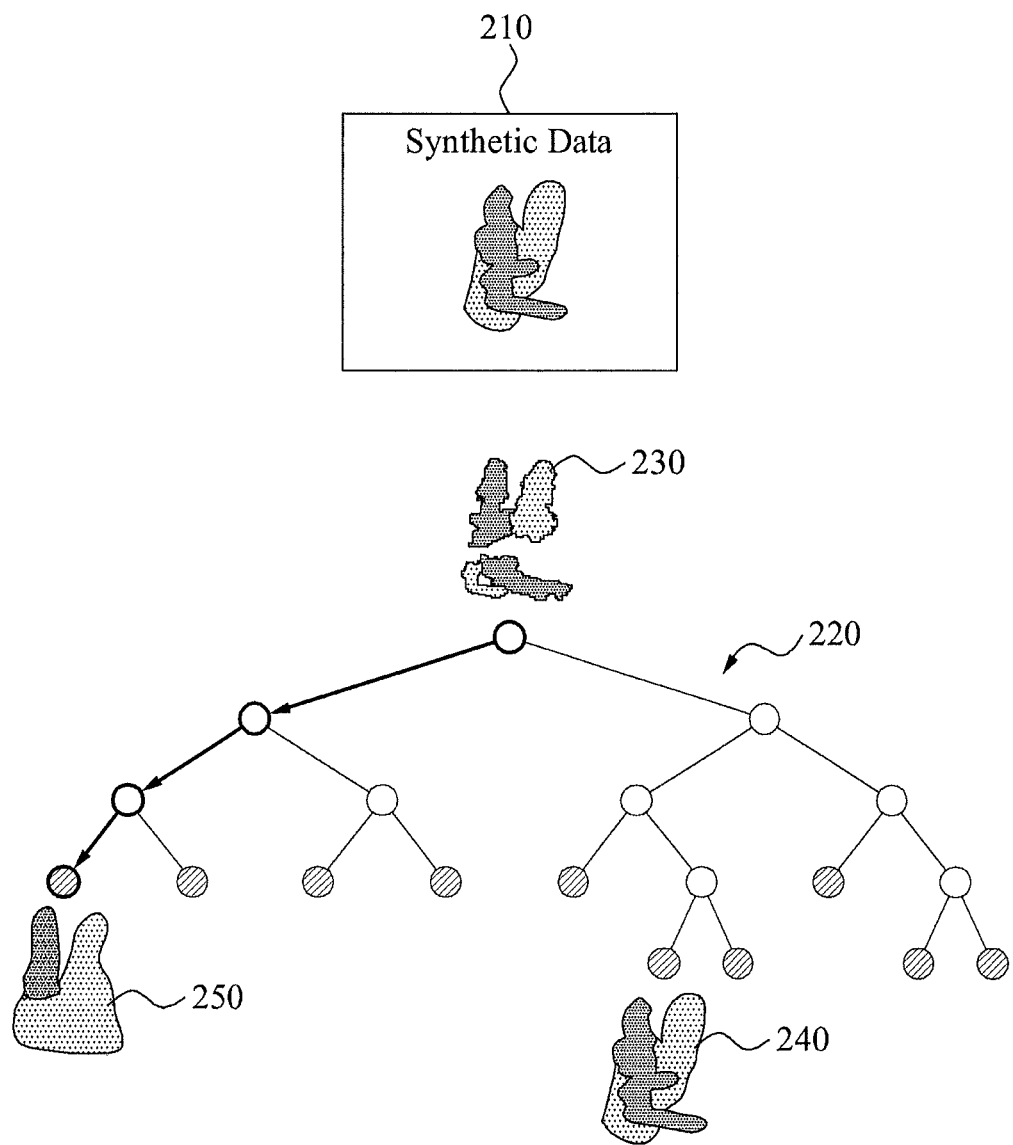

When the estimator is trained using the synthetic data 110, a performance of the estimator configured to estimate a pose of an articulated object may decrease because of differences in the appearances of the synthetic data 110 and the real data 120. In particular, the synthetic data 110 may be generated based on the model 130 of the articulated object and thus, may have an appearance similar to the actual articulated object 140. However, the real data 120 in which the actual articulated object 140 is photographed may include noise and holes and thus, may have an appearance different from an appearance of the actual articulated object 140. Referring to FIG. 2A, an estimator 220 trained using a training dataset 210 including synthetic data may output a result 250 other than a result 240 corresponding to an actual pose when real data 230 having an appearance differing from an appearance of the synthetic data is input.

The estimator may be trained based on an association 150 between the synthetic data 110 and the real data 120. In this example, the pose estimating scheme may provide technology that reduces resources to be used to train the estimator and increases performance of the estimator. Referring to FIG. 2B, an estimator 270 trained using a training dataset 260 including both synthetic data and real data may output a result 240 corresponding to an actual pose, although real data 230 having an appearance different from an appearance of the synthetic data is input. In addition, the estimator 270 may output an identical result 240, although real data 235, not yet learned, but having an appearance similar to the appearance of the learned real data 230, is input.

Figure 3:
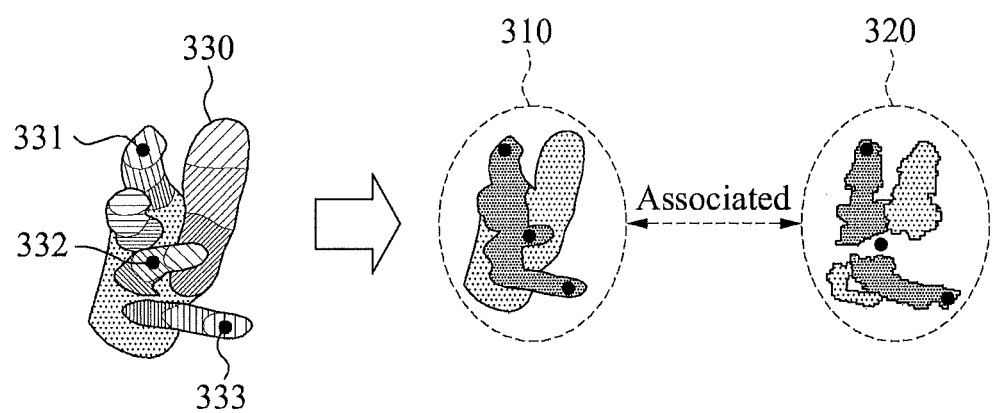

A pose of an articulated object may be estimated based on both the synthetic data 110 and the real data 120. For example, the synthetic data 110 and the real data 120 including depth images having different appearances but identical joint locations may be mutually associated with each other. Referring to FIG. 3, it may be determined whether labeled data included in synthetic data 310 matches labeled data included in real data 320. The labeled data may include information on locations of a plurality of joints included in the articulated object. In a model 330 of the articulated object, the synthetic data 310 may include labeled data matching a first joint location 331, a second joint location 332, and a third joint location 333, whereas the real data 320 may include labeled data matching the first joint location 331, the second joint location 332, and the third joint location 333. Although an appearance of the synthetic data 310 differs from an appearance of the real data 320, the synthetic data 310 may be associated with the real data 320 based on a determination that the labeled data included in the synthetic data 310 matches the labeled data included in the real data 320, thereby filling in holes or other distortions included in the real data 320.

Figure 4:
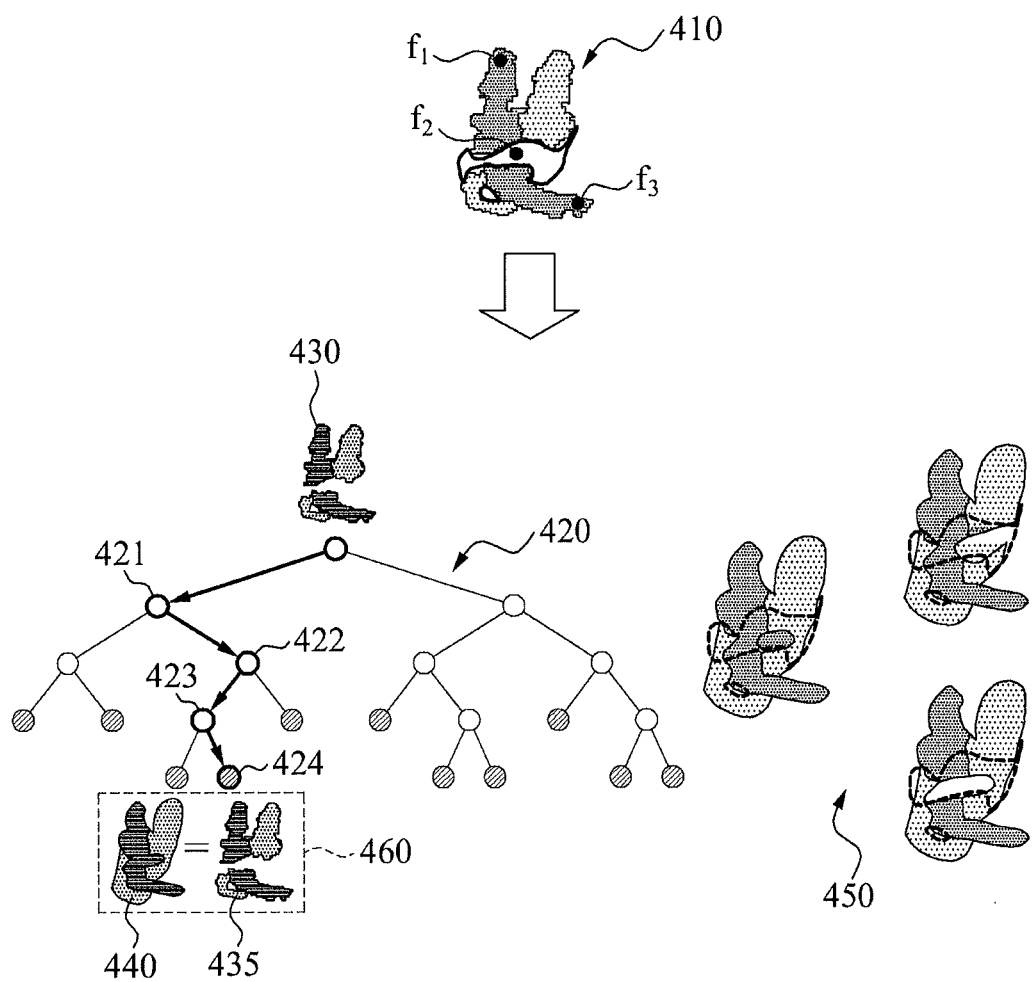

FIG. 4 illustrates a principle of training an estimator configured to estimate a pose of an articulated object in a pose estimating scheme according to example embodiments.

Referring to FIG. 4, when the estimator is trained, features included in an error area, for example, noise and a hole, included in a depth image may be excluded. For example, among a plurality of features $f_1$, $f_2$, and $f_3$ included in a depth image 410, an estimator 420 may be trained using features $f_1$ and $f_3$, excluding a feature $f_2$ included in an error area. Accordingly, the estimator 420 may restore and recognize errorless synthetic data 440 although real data 430 including an error area, for example, noise and a hole, has been received. When the real data 430 is input into the estimator 420, the real data 430 may pass through branch nodes 421, 422, and 423 and reach a leaf node 424. The leaf node 424 is a node having an association 460. The estimator 420 may restore, based on the association 460, a pose of the synthetic data 440 from a pose of real data 435 having reached the leaf node 424. In addition, the estimator 420 may also restore and recognize the errorless synthetic data 440 even when items of real data 450, each including an error area, for example, noise and a hole, not yet learned but similar to a previously learned area, are received.

Estimator Training Method According to Example Embodiments

Figure 5:
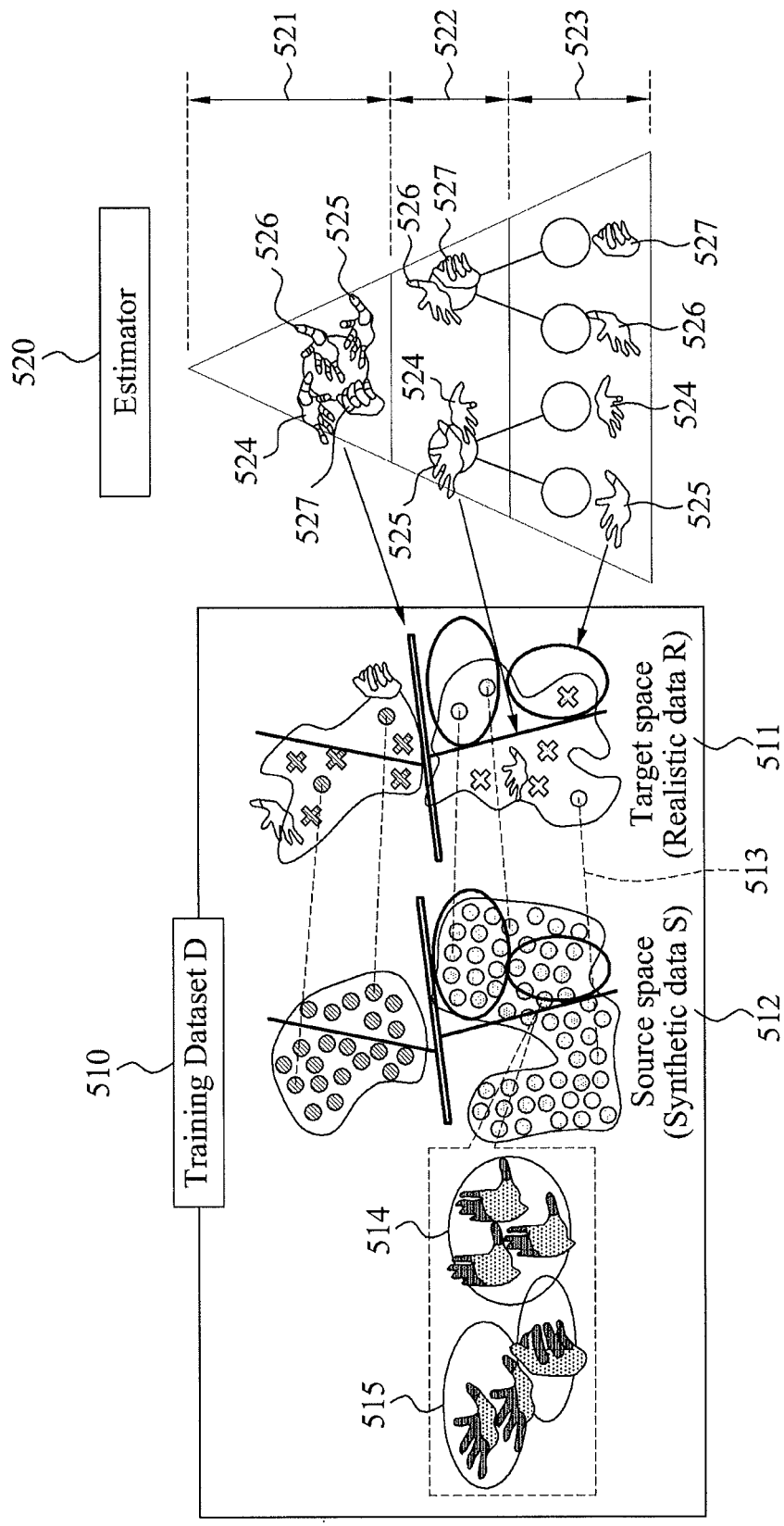
FIG. 5 illustrates a method of training an estimator according to example embodiments.

FIG. 5 illustrates a method of training an estimator according to example embodiments.

Referring to FIG. 5, a training dataset 510 may be collected. The training dataset 510 may include a target domain 511 and a source domain 512. The target domain 511 may include partially labeled real data, and the source domain 512 may include wholly labeled synthetic data. An association 513 between the synthetic data included in the source domain 512 and labeled real data included in the target domain 511 may be generated. The labeled real data may refer to labeled data among real data included in the target domain 511. In the training dataset 510, labeled data may be indicated using a symbol ◎ and unlabeled data may be indicated using a symbol ✖. In the target domain 511, a portion marked with the symbol ◎ may correspond to labeled real data, and a portion marked with the symbol ✖ may correspond to unlabeled real data. In the source domain 512, a portion marked with the symbol ◎ may correspond to synthetic data.

The estimator learning method may be based on a transductive model. Knowledge transformation from synthetic data to real data may be applied. Associations between the synthetic data and the real data may be preserved. For example, an estimator 520 may be trained to identically classify the mutually associated synthetic data and real data.

Labeled data and unlabeled data may be jointly modeled. A change in a viewpoint with respect to a pose of an articulated object may be processed using an adaptive hierarchical classification scheme. Both the labeled data and the unlabeled data may be used. As described above, the labeled data may refer to data on which labeling has been performed, and may include information on a plurality of joints included in the articulated object. Each element included in the labeled data may include information on a joint closest to the corresponding element, and information on relative locations between the corresponding element and the plurality of joints included in the articulated object. The unlabeled data may refer to data on which labeling has yet to be performed, and may be distinct from the labeled data in that the unlabeled data may not include information on the plurality of joints included in the articulated object.

The estimator may be trained using a similarity between an appearance of the labeled data and an appearance of the unlabeled data. Irrespective of whether data corresponds to labeled data or unlabeled data, the estimator may be trained using a similarity between appearances of data. For example, the estimator 520 may be trained to identically classify items of data having appearances 514 of a frontward palm, and separately classify items of data having appearances 515 of a downward palm.

The estimator training method according to example embodiments may cover a wide range of poses from synthetic data and derive an estimator configured to estimate accurate poses from real data. In addition, the estimator training method may reduce a cost for labeling since labeling may not be performed on all of the wide range of real data.

Training Dataset According to Example Embodiments

Referring to FIG. 5, the training dataset D 510 may include real data R included in the target domain 511 and synthetic data S included in the source domain 512. In the target domain 511, a portion of the real data R may correspond to labeled real data $R_l$ indicated using the symbol ◎, and a remaining portion of the real data R may correspond to unlabeled real data $R_u$ indicated using the symbol ✖. In the source domain 512, all datapoints included in the synthetic data S may correspond to labeled data indicated using the symbol ◎. The training dataset D 510 may include $\{R_l, R_u, \text{and } S\}$, and labeled data L may include $\{R_l, S\}$.

All datapoints included in the training dataset D 510 may be expressed by patches. The patches may be sampled at random from a training depth image. A number of the patches sampled from the training depth image or a number of the datapoints may correspond, for example, to 5% of foreground pixels included in the training depth image. All datapoints included in the labeled real data Rl or the synthetic data S may be assigned a tuple of (a, p, v).

A viewpoint label a may indicate a viewpoint. The viewpoint label "a" may indicate one of a plurality of quantized viewpoints. A viewpoint of a patch may be expressed by a roll, a pitch, and a yaw. The roll, the pitch, and the yaw may be respectively quantized into predetermined steps. For example, the roll may be quantized into three steps, the pitch may be quantized into five steps, and the yaw may be quantized into nine steps. In this example, the viewpoint of the patch may be quantized into 135 steps.

Figure 6:
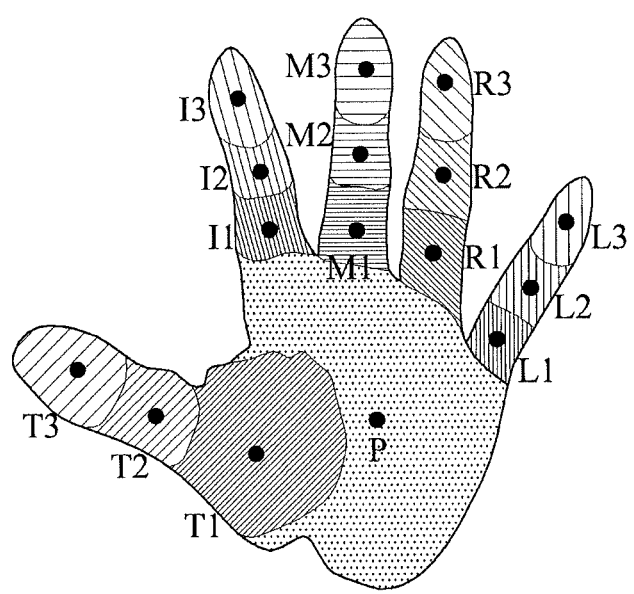
FIG. 6 illustrates classes included in a hand of a user according to example embodiments.

A class label "p" may indicate a joint closest to a datapoint. Patches closes to an identical joint may have an identical class label. Referring to FIG. 6, when an articulated object corresponds to a hand of a user, the articulated object may include a total of sixteen joints. Since each of the sixteen joints may correspond to a single class, the articulated object may be classified into a total of sixteen classes. The sixteen classes may include three classes T1, T2, and T3 on a thumb, three classes I1, I2, and I3 on an index finger, three classes M1, M2, and M3 on a middle finger, three classes R1, R2, and R3 on a ring finger, three classes L1, L2, and L3 on a little finger, and one class P on a palm. The class label p may indicate the sixteen classes using elements of a set $\{1, \ldots, 16\}$, respectively.

Figure 7:
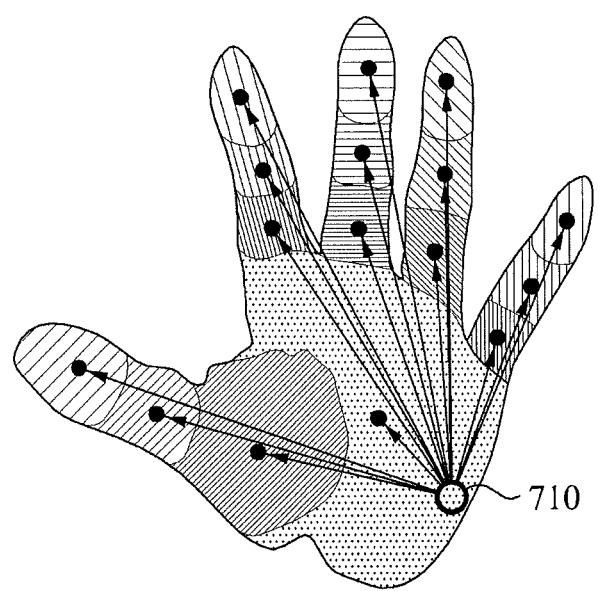
FIG. 7 illustrates a plurality of vectors included in a vector set according to example embodiments.

A vector set v may include a plurality of vectors having directions from a reference point of a patch corresponding to a datapoint, for example, a center of the patch, toward a plurality of joints included in the articulated object. Each of the plurality of vectors may be expressed by a 3D vector (x, y, z). For example, when estimating a hand of a user, the vector set v may include sixteen 3D vectors. Thus, the vector set v may have $R^{3 \times 16}$ dimensions. Referring to FIG. 7, the vector set v may include sixteen vectors having directions from a patch 710 toward sixteen joints.

An association between real data and synthetic data may be generated by matching datapoints included in the labeled real data $R_l$ and the synthetic data S. The datapoints included in the labeled real data $R_l$ and the synthetic data S may be matched based on 3D locations of the plurality of joints included in the articulated object. The association between the real data and the synthetic data may be defined as expressed by Equation 1.

$$\Psi(r \in \mathcal{R}_l, s \in S) = \begin{cases} 1 & \text{when } r \text{ matches } s \\ 0 & \text{otherwise} \end{cases} \quad [\text{Equation 1}]$$

In Equation 1, r denotes a datapoint included in the labeled real data $R_l$, and s denotes a datapoint included in the synthetic data S. Referring to Equation 1, 3D locations of a plurality of joints indicated by the datapoint r may be compared to 3D locations of a plurality of joints indicated by the datapoint s. When the 3D locations of the plurality of joints indicated by the datapoint r match the 3D locations of the plurality of joints indicated by the datapoint s, it may be determined that the datapoint r matches the datapoint s. When it is determined that the datapoint r matches the datapoint s, the association $\Psi$ between the real data and the synthetic data may be set to "1". When it is determined that the datapoint r does not match the datapoint s, the association $\Psi$ between the real data and the synthetic data may be set to "0".

Estimator According to Example Embodiments

An estimator may be trained to classify, cluster, or regress both a source domain and a target domain. In this aspect, the estimator may be distinct from an estimator trained to perform each of classification, clustering, and regression separately.

Referring to FIG. 5, the estimator 520 may be trained to classify items of data included in the source domain and the target domain simultaneously at an uppermost node 521. At the uppermost node 521, four training data groups 524, 525, 526, and 527 may be input. Each datapoint included in the four training data groups 524, 525, 526, and 527 may correspond to a datapoint extracted from the source domain, or a datapoint extracted from the target domain. The estimator 520 may classify the four training data groups 524, 525, 526, and 527 based on a viewpoint at the uppermost node 521. In this example, the training data groups 524 and 525 may be classified based on an identical viewpoint and transferred to a left child node. In addition, the training data groups 526 and 527 may be classified based on another identical viewpoint and transferred to a right child node.

The estimator 520 may be trained to classify items of data included in the source domain and the target domain simultaneously at middle nodes 522. At the left node of the middle nodes 522, two training data groups 524 and 525 may be input. The estimator 520 may classify the two training data groups 524 and 525 based on a class at the left node of the middle nodes 522. In this example, the training data group 525 may be classified by a class corresponding to an end segment of the thumb and transferred to a left child node. The training data group 524 may be classified by a class corresponding to a first segment of the index finger and transferred to a right child node. In addition, the estimator 520 may regress the items of data included in the source domain and the target domain at a leaf node 523. The regression operation will be described later in detail through a quality function $Q_v$ to regress a vector set.

Depending on a case, the estimator 520 may combine the items of data included in the source domain and the target domain at the uppermost node 521, the middle node 522, or the leaf node 523. The combination operation will be described later in detail through a quality function $Q_u$ to combine appearances of datapoints included in the real data, irrespective of a distinction between labeled data and unlabeled data.

The estimator training method may provide technology that estimates a high-confidence pose without labeling real data related to all possible poses of an articulated object which may perform sophisticated and various poses, for example, a hand of a user. The estimator may be trained using a low computation complexity. As described above, a decision tree to estimate a pose of the articulated object may be generated. The decision tree may be generated by branching nodes recursively and transferring training data received at a current node to child nodes.

Figure 8:
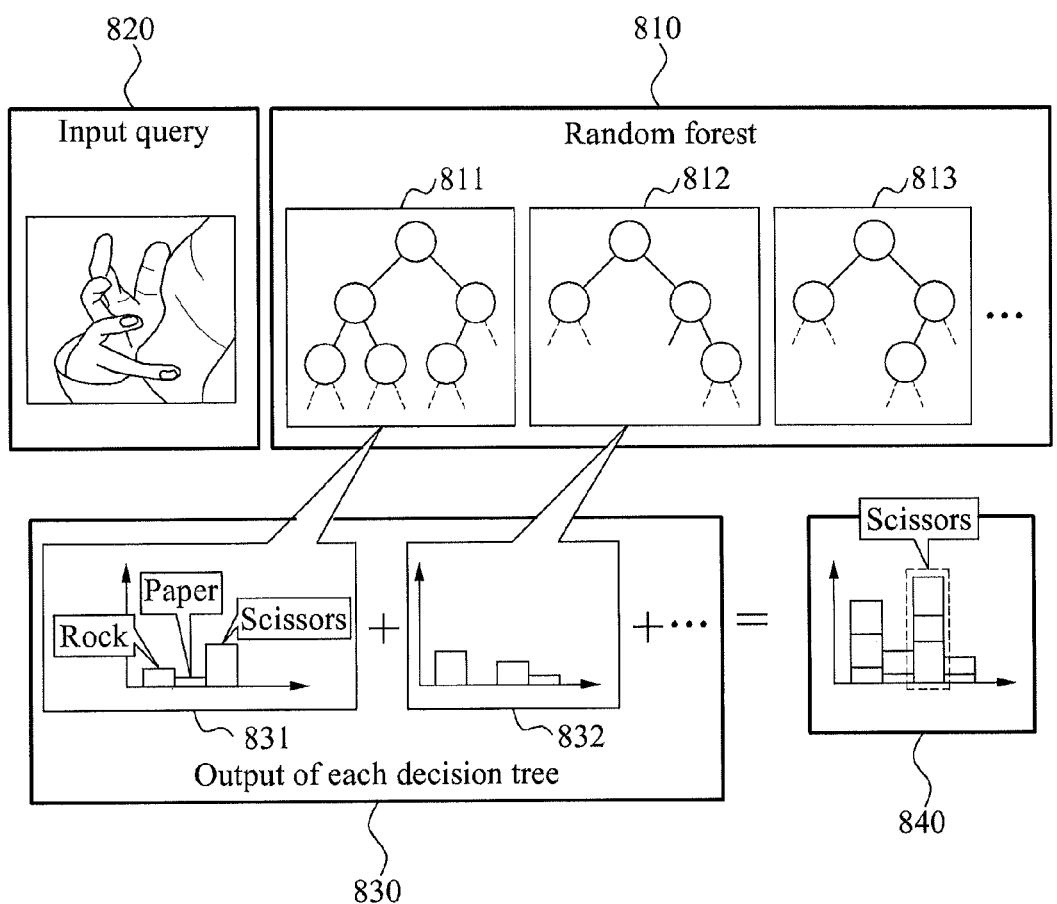
FIG. 8 illustrates a random forest according to example embodiments.

A random forest to estimate a pose of an articulated object may be generated. Referring to FIG. 8, a random forest 810 may include a plurality of decision trees 811, 812, and 813. Each of the decision trees 811, 812, and 813 may be generated to differ from one another since a quality function may be selected at random at each of a plurality of nodes included in the decision trees 811, 812, and 813. When an input query 820 is input into the generated random forest 810, the input query 820 may be processed by each of the decision trees 811, 812, and 813. The random forest 810 may output a plurality of results including results 831 and 832 corresponding to the plurality of decision trees 811, 812, and 813. The random forest 810 may combine the plurality of results including the results 831 and 832 and derive a final result 840.

Candidate groups of a branch node may be generated at each node, and a candidate that maximizes a quality function may be selected from the candidate groups. The quality function may refer to a function being an indicator to determine a branching direction of data at each node included in a decision tree. A quality function to be used at each node may be selected at random. Quality functions as expressed by Equation 2 may be used.

$$\begin{cases} Q_{apv} = \alpha Q_a + (1-\alpha)\beta Q_p + (1-\alpha)(1-\beta)Q_v \\ Q_{tss} = Q_t^\omega Q_u \end{cases} \quad \text{[Equation 2]}$$

In Equation 2, a quality function $Q_{apv}$ denotes a quality function to train the estimator with a decision tree using a quality function $Q_a$ to classify a viewpoint, a quality function $Q_p$ to classify a joint, and a quality function $Q_v$ to regress a vector set. A quality function $Q_{tss}$ denotes a quality function to train the estimator with a decision tree using a quality function $Q_t$ to preserve an association between synthetic data and real data, and a quality function $Q_u$ to combine appearances of datapoints included in the real data, irrespective of a distinction between labeled data and unlabeled data. A parameter $\alpha$ and a parameter $\beta$ denote flags to select one of the quality function $Q_a$, the quality function $Q_p$, and the quality function $Q_v$. A parameter w denotes a weight to adjust a relative significance between the quality function $Q_t$ and the quality function $Q_u$.

One of the quality function $Q_{apv}$ and the quality function $Q_{tss}$ may be selected at random at each node of the decision tree. A branch node configured to branch datapoints input at a corresponding node may be generated using the selected quality function. Hereinafter, the quality functions $Q_a$, $Q_p$, and $Q_v$ used for the quality function $Q_{apv}$, and the quality functions $Q_t$ and $Q_u$ used for the quality function $Q_{tss}$ will be described in detail.

Quality Function $Q_a$

The quality function $Q_a$ refers to a quality function to classify a viewpoint. Information gain may be used to evaluate a classification performance of all viewpoint labels a included in labeled data L. Since the quality function $Q_a$ may be applied at a top of a hierarchy, evaluating a large amount of training samples may be necessary. To avoid memory restrictions and reduce a training time, reservoir sampling may be employed. In this instance, the quality function $Q_a$ may optimize a decision tree by classifying viewpoints in labeled data.

Quality Function $Q_p$

The quality function $Q_p$ refers to a quality function for joint classification. Information gain may be used to evaluate a classification performance of class labels p included in labeled data L. The quality function $Q_p$ may measure a performance of classifying an individual patch included in the labeled data L. The quality function $Q_p$ may optimize a decision tree by classifying classes in labeled data.

Quality Function $Q_v$

The quality function $Q_v$ refers to a quality function for vector set regression. A regression aspect of a decision tree may be trained by measuring a compactness of vector sets. With respect to vector sets J(L) provided in labeled data L, the quality function $Q_v$ may be defined as expressed by Equation 3.

$$Q_v = \left[1 + \frac{|\mathcal{L}_{lc}|}{|\mathcal{L}|}\Lambda(\mathcal{J}(\mathcal{L}_{lc})) + \frac{|\mathcal{L}_{rc}|}{|\mathcal{L}|}\Lambda(\mathcal{J}(\mathcal{L}_{rc}))\right]^{-1} \quad \text{[Equation 3]}$$

In Equation 3, $L_{lc}$ denotes training data transferred to a left child node, and $L_{rc}$ denotes training data transferred to a right child node. $\Lambda(.)$ denotes an operator indicating a difference between images. For example, when a value of $\Lambda(.)$ is great, features included in a target group may differ from each other. When the value of $\Lambda(.)$ is small, the features included in the target group may be similar. A value of the quality function $Q_v$ may increase as a uniformity of vector sets in a node increases. When all vectors in the node are identical, the value of the quality function $Q_v$ may converge to "1". As described below, the quality function $Q_v$ may be selected when both a purity related to a viewpoint and a purity related to a class of training data transferred to a node are high. Accordingly, the quality function $Q_v$ may evaluate a uniformity of vector sets included in a substantially identical viewpoint and a substantially identical class.

Quality Function $Q_u$

The quality function $Q_u$ refers to a quality function to combine appearances of datapoints included in real data, irrespective of a distinction between labeled data and unlabeled data. An appearance of a target domain, for example, real data, may be modeled to include unlabeled data. Under an assumption that an appearance and a pose of an articulated object may have an intimate relationship at an identical viewpoint, the quality function $Q_u$ may evaluate appearance similarities of all patches included in real data R in a node, as expressed by Equation 4.

$$Q_u = \left[1 + \frac{|\mathcal{R}_{lc}|}{|\mathcal{R}|}\Lambda(\mathcal{R}_{lc}) + \frac{|\mathcal{R}_{rc}|}{|\mathcal{R}|}\Lambda(\mathcal{R}_{rc})\right]^{-1} \quad \text{[Equation 4]}$$

In Equation 4, $R_{lc}$ denotes training data transferred to a left child node, and $R_{rc}$ denotes training data transferred to a right child node. $\Lambda(.)$ denotes an operator indicating a difference between images. For example, when a value of $\Lambda(.)$ is great, features included in a target group may differ. When the value of $\Lambda(.)$ is small, the features included in the target group may be similar. A value of the quality function $Q_u$ may increase as a uniformity of appearances in a node increases. When all appearances in the node are identical, the value of the quality function $Q_u$ may converge to "1". Since a quantity of unlabeled data in real data may surpass a quantity of labeled data in the real data, the unlabeled data may be essential to model the target domain, for example, the real data. To expedite a learning operation, the quality function $Q_u$ may perform down-sampling with respect to patches in the real data R.

Quality Function $Q_t$

The quality function $Q_t$ refers to a quality function to preserve an association between synthetic data and real data. The quality function $Q_t$ may preserve a cross-domain association $\Psi$ when training data is transferred throughout a decision tree, as expressed by Equation 5.

$$Q_t = \frac{|\{r,s\} \subset \mathcal{L}_{lc}| + |\{r,s\} \subset \mathcal{L}_{rc}|}{|\{r,s\} \subset \mathcal{L}|} \quad \text{[Equation 5]}$$

$$\forall \{r,s\} \subset \mathcal{L} \text{ where } \Psi(r,s) = 1$$

In Equation 5, $L_{lc}$ denotes training data transferred to a left child node, and $L_{rc}$ denotes training data transferred to a right child node. r denotes a datapoint included in real data R, and denotes a datapoint included in synthetic data S. $\Psi(r,s)=1$ indicates that r and s are mutually associated. The quality function $Q_t$ may evaluate a ratio of a preserved association after branching is performed at a branch node.

Adaptive Switching

A decision tree may be generated by hierarchically applying a quality function $Q_a$ for viewpoint classification, a quality function $Q_p$ to classify a class, and a quality function $Q_v$ for vector set regression based on a purity of a node. The decision tree may perform a classification operation at an uppermost level. A training objective of the decision tree may be switched adaptively to perform a regression operation at a lower level. A parameter α and a parameter β denote flags to select one of the quality function $Q_a$, the quality function $Q_p$, and the quality function $Q_v$. Referring to Equation 2, when the parameter α corresponds to "1", $Q_{apv}=Q_a$. When the parameter α corresponds to "0" and the parameter β corresponds to "1", $Q_{apv}=Q_p$. When the parameter α corresponds to "0" and the parameter β corresponds to "0", $Q_{apv}=Q_v$. In this example, the parameter α and the parameter β may be determined as expressed by Equation 6.

$$\alpha = \begin{cases} 1 & \text{if } \Delta_a(\mathcal{L}) < t_\alpha \\ 0 & \text{otherwise} \end{cases} \qquad \text{[Equation 6]}$$

$$\beta = \begin{cases} 1 & \text{if } \Delta_p(\mathcal{L}) < t_\beta \\ 0 & \text{otherwise} \end{cases}$$

In Equation 6, $\Delta_a(L)$ denotes a difference in weight between a viewpoint label a1 having a greatest weight and a viewpoint label a2 having a second greatest weight in labeled data L. $\Delta_p(L)$ denotes a difference in weight between a class label p1 having a greatest weight and a class label p2 having a second greatest weight in the labeled data L. $t_\alpha$ and $t_\beta$ denotes predetermined threshold values. Structures of decision trees to be generated may be changed based on $t_\alpha$ and $t_\beta$.

A purity of a node may be measured using $\Delta_a(L)$ and $\Delta_p(L)$. When $\Delta_a(L)$ is less than $t_\alpha$, it may mean that the viewpoint label a1 having the greatest weight and the viewpoint label a2 having the second greatest weight in the labeled data L have similar weights. For example, when a weight of the viewpoint label a1 having the greatest weight in the labeled data L corresponds to 50, and a weight of the viewpoint label a2 having the second greatest weight in the labeled data L corresponds to 48, it may be determined that datapoints in the node may have a low purity related to viewpoints. In this example, the parameter α may correspond to "1". Thus, a branch node to classify a viewpoint using the quality function $Q_a$ may be generated.

Conversely, when $\Delta_a(L)$ is greater than $t_\alpha$, it may mean the difference in weight between the viewpoint label a1 having the greatest weight and the viewpoint label a2 having the second greatest weight in the labeled data L may be great. For example, when the weight of the viewpoint label a1 having the greatest weight in the labeled data L corresponds to 95, and the weight of the viewpoint label a2 having the second greatest weight in the labeled data L corresponds to 3, it may be determined that the datapoints in the node may have a high purity related to viewpoints. In this example, the parameter α may correspond to "0", whether a branch node to classify a class using the quality function $Q_p$ is to be generated may be determined.

Similarly, when $\Delta_p(L)$ is less than $t_\beta$, it may mean that the class label p1 having the greatest weight and the class label p2 having the second greatest weight in the labeled data L may have similar weights. For example, when a weight of the class label p1 having the greatest weight in the labeled data L corresponds to 50, and a weight of the class label p2 having the second greatest weight in the labeled data L corresponds to 48, it may be determined that datapoints in the node may have a low purity related to classes. In this example, the parameter α may correspond to "0" and the parameter β may correspond to "1". Thus, a branch node to classify a class using the quality function $Q_p$ may be generated.

Conversely, when $\Delta_p(L)$ is greater than $t_\beta$, it may mean the difference in weight between the class label p1 having the greatest weight and the class label p2 having the second greatest weight in the labeled data L may be relatively great. For example, when the weight of the class label p1 having the greatest weight in the labeled data L corresponds to 95, and the weight of the class label p2 having the second greatest weight in the labeled data L corresponds to 3, it may be determined that the datapoints in the node may have a high purity related to classes. In this example, the parameter α may correspond to "0" and the parameter β may correspond to "0", a branch node to perform vector set regression using the quality function $Q_v$ may be generated.

Figure 9:
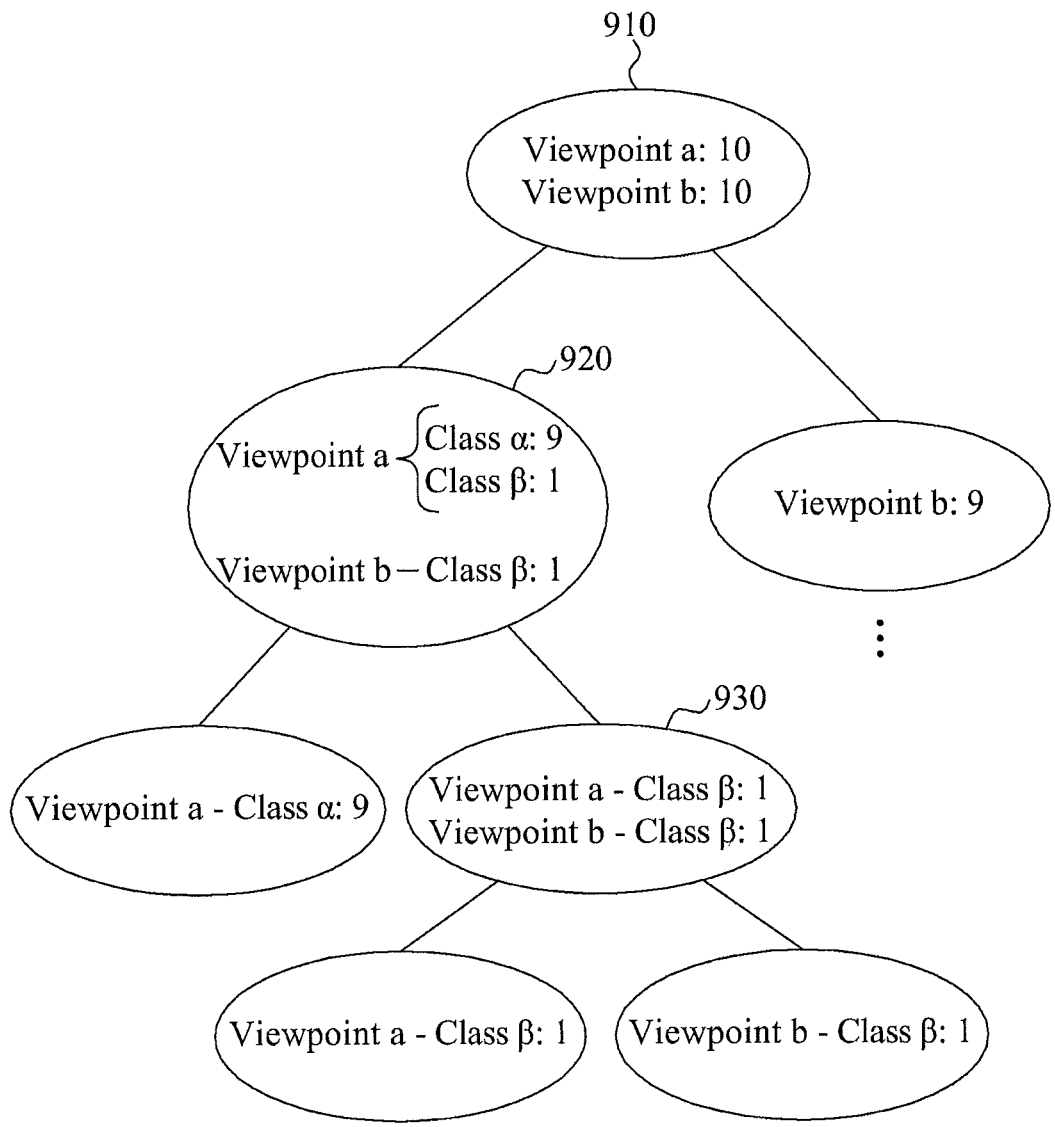
FIG. 9 illustrates switching hierarchies of quality functions.

Referring to FIG. 9, hierarchies of quality functions used for $Q_{apv}$ may be switched. Hereinafter, in an example of FIG. 9, $t_\alpha$ may correspond to 0.8, and $t_\beta$ may correspond to 0.8. A training dataset input at a root node 910 may include ten viewpoints a, and ten viewpoints b. At the root node 910, a purity related to viewpoints may correspond to $\Delta_a=(10-10)/20$. Since $\Delta_a (=0.00)<t_\alpha(=0.80)$, α=1. In this example, a branch node to classify a viewpoint at the root node 910 using the quality function $Q_a$ may be generated.

As a result of classifying the training dataset at the root node 910, the ten viewpoints a, and a single viewpoint b, may be transferred to a left child node. At a middle node 920, a purity related to viewpoints may correspond to $\Delta_a=(10-1)/11$. Since $\Delta_a (=0.82)>t_\alpha(=0.80)$, α=0. In this example, a determination may be made as to whether the quality function $Q_p$ to classify a class corresponding to a subsequent hierarchy, among the quality functions, is to be used. The ten viewpoints a input at the middle node 920 may include nine classes α and a single class β, and the single viewpoint b may include a single class β. The training dataset input at the middle node 920 may include nine classes α and two classes β. At the middle node 920, a purity related to classes may correspond to $\Delta_p=(9-2)/11$. Since $\Delta_p (=0.64)<t_\beta(=0.80)$, β=1. A branch node to classify a class at the middle node 920 using the quality function $Q_p$ may be generated.

As a result of classifying the dataset at the middle node 920, the nine classes α may be transferred to a left child node, and the two classes β may be transferred to a right child node, for example. A quality function corresponding to a subsequent hierarchy may correspond to the quality function $Q_v$ to regress a vector set. The training dataset transferred to a middle node 930 may include a single viewpoint a, and a single viewpoint b. At the middle node 930, $\Delta_a=(1-1)/2$. Since $\Delta_a(=0.00)<t_\alpha(=0.80)$, α=1. In this example, the purity $\Delta_a$ related to the viewpoints is less than $t_\alpha$ again at the middle node 930. Thus, a branch node to classify a viewpoint using the quality function $Q_a$ to classify a viewpoint corresponding to an uppermost hierarchy may be generated once again.

Data-Driven Kinematic Model According to Example Embodiments

Although a great deal of noise may be included in an input image, a pose of an articulated object may be estimated. In spite of self-occlusion, the pose of the articulated object may be estimated. Here, self-occlusion refers to, for example, a phenomenon in which a portion of an object included in the input image is obscured by another part of the object. For example, a user's hand may obscure a portion of the user's thumb. In a case of estimating a pose of a hand of a user, an error caused by the self-occlusion may increase, when compared to estimating a pose of a body of the user. Since the thumb and four fingers are adjacent to each other, in contrast to both arms and both legs, a probability of self-occlusion may be high. Since poses performed by a hand may be more varied than poses performed by a body, many errors may occur due to the self-occlusion.

Although occlusion or noise may hinder verification of the location of the joint, the pose estimating scheme may provide technology that calculates a location of a predetermined joint using a pseudo-kinematic model. The estimator may consider each joint included in the articulated object as an independent target to be detected. Accordingly, when an image of a portion corresponding to a predetermined joint is missing or a predetermined joint is obscured by another part of the articulated object in an input depth image, structural information to be used to restore the missing or obscured joint may be insufficient.

The data-driven kinematic model may be used when the estimator refines a joint location. A large volume of pose database K may be used. The volume of the pose database K may be significantly greater than an amount of synthetic data S. As the volume of the pose database K increases, power coverage may increase. The large volume of pose database K may include joint coordinates. Patches included in the synthetic data S may include a tuple of (a, p, v). However, two datasets may be distinguished from each other in that patches included in the pose database K may include joint coordinates. A procedure of calculating a data-driven kinematic model $\mathcal{G}$ may be arranged using Algorithm 1 of Table 1 below.

TABLE 1

Algorithm 1: Data-driven Kinematic Models.

Data: A joint dataset $\mathcal{K} \subset \mathbb{R}^{3 \times 16}$ that contains
synthetic joint locations, where $|\mathcal{K}| \gg |S|$.
Result: A set of viewpoint-dependent distributions
$\mathcal{G} = \{\mathcal{G}_i | \forall i \in \mathcal{A}\}$ of global poses.
1  Split $\mathcal{K}$ with respect to viewpoint label $\mathcal{A}$, such that
$\mathcal{K} = \{\mathcal{K}_1 \ldots \mathcal{K}_{|\mathcal{A}|}\}$
2  forall the $i \in \mathcal{A}$ do
3     Learn a N-part GMM $\mathcal{G}_i$ of the dataset $\mathcal{K}_i$:
      $\mathcal{G}_i = \{\mu_i^1 \ldots \mu_i^n \ldots \mu_i^N; \Sigma_i^1 \ldots \Sigma_i^n \ldots \Sigma_i^N\}$, where
      $\mu_i^n$ and $\Sigma_i^n$ denote the mean and diagonal variance
      of the n-th Gaussian component in $\mathcal{G}_i$ of viewpoint
      i.

Input data input into Algorithm 1 may correspond to the large volume of pose database K. The pose database K may include joint coordinates. When the articulated object corresponds to a hand of a user, a total number of joints may be sixteen. In this example, the pose database K may include $R^{3 \times 16}$ metric dimensions. As described above, for a wide range of pose coverage, the pose database K having the volume significantly greater than the amount of the synthetic data S may be input. An output of Algorithm 1 may correspond to a set $\mathcal{G}$ of viewpoint-dependent distributions with respect to the pose of the articulated object. Algorithm 1 may partition the pose database K based on a viewpoint label A. The pose database K may be partitioned into $\{k1, \ldots, k_{|A|}\}$. |A| denotes a total number of viewpoints. Algorithm 1 may generate may generate an N-part Gaussian mixture model (GMM) $\mathcal{G}_i$ using a database $K_i$ with respect to each viewpoint. N may be an integer greater than "2", and $\mathcal{G}_i$ may include N averages and N variances.

Joint Classification and Detection According to Example Embodiment

An input image in which an articulated object is photographed may be received, and a plurality of patches may be extracted from the received input image. Each of the plurality of extracted patches may be input into the estimator. The estimator may include a decision tree, and each of the plurality of input patches may be transferred from a root node to a leaf node of the decision tree. Referring to FIG. 7, the patch 710, among the plurality of input patches, may correspond to a palm part. Each node included in the estimator may determine whether the patch 710 is to be branched in a left direction or a right direction, based on a result of being trained with a quality function of the corresponding node.

Each node may determine a branching direction of the patch 710 as learned through a process of generating the decision tree. When the root node is generated using the quality function $Q_{apv}$, the root node may select one of the quality function $Q_a$, the quality function $Q_p$, and the quality function $Q_v$ based on a purity of the root node. At the root node, a purity related to viewpoints may not be relatively high and thus, the quality function $Q_a$ may be selected. In this example, the root node may correspond to a branch node to classify a viewpoint. Accordingly, when the patch 710 is received, the root node may determine the branching direction based on a viewpoint of the patch 710.

When a left child node of the root node is generated using the quality function $Q_{tss}$, the left child node may correspond to a branch node to determine a branching direction using a combination of the quality function $Q_t$ and the quality function $Q_u$. Accordingly, when the patch 710 is received, the left child node may determine the branching direction based on an association between synthetic data and real data and an appearance of the patch 710.

When each patch reaches a leaf node, Algorithm 2, provided later in Table 2, may obtain a vector set v and a viewpoint "a" corresponding to a leaf node that each patch reached. Algorithm 2 may calculate joint coordinates indicated by each patch based on the vector set v. For example, a vector set v corresponding to the patch 710 may include sixteen vectors. Algorithm 2 may verify a location of the patch 710 in the input depth image, and calculate locations of sixteen joints indicated by the sixteen vectors from the center of the patch 710. Each of the sixteen joint locations may be expressed by 3D coordinates (x, y, z).

Kinematic Joint Refinement According to Example Embodiments

Figure 10:
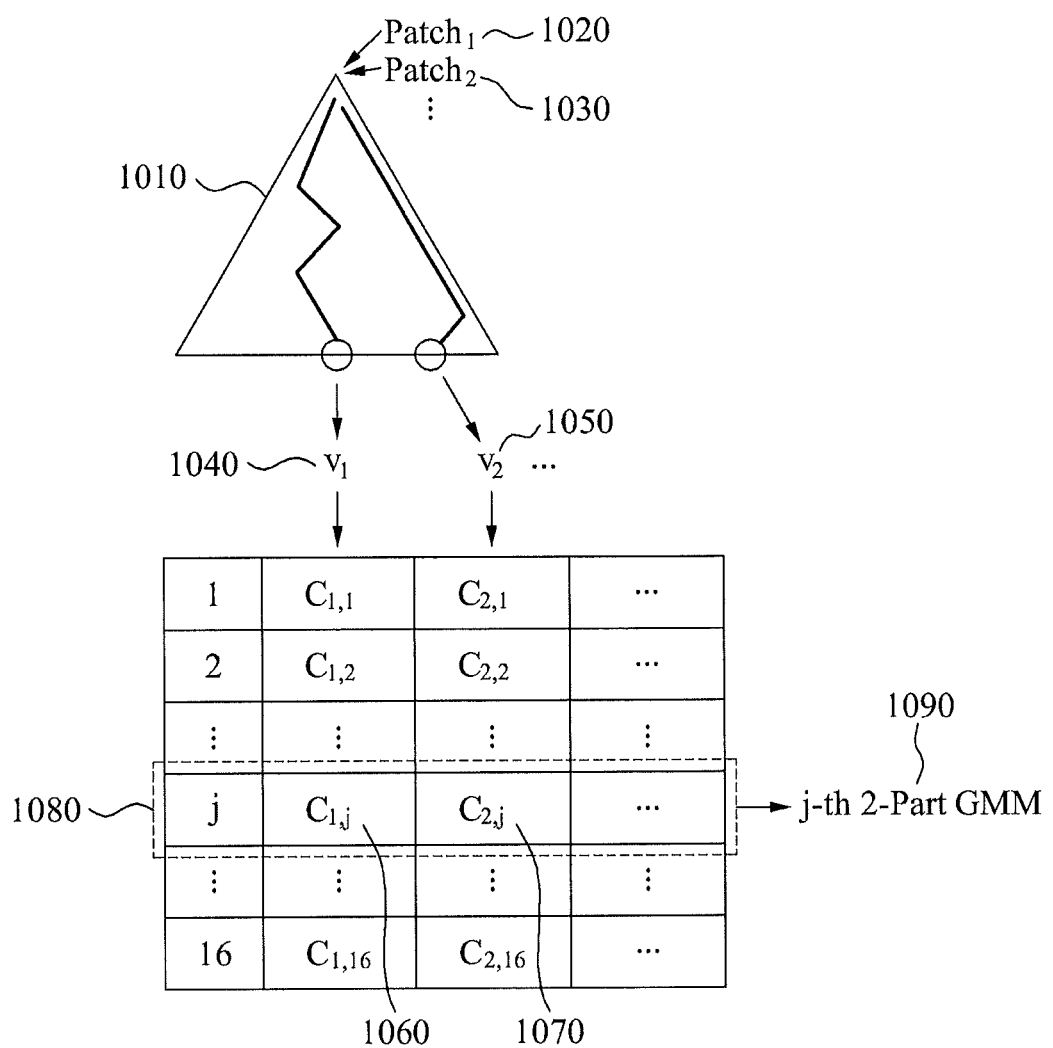
FIG. 10 illustrates an operation of calculating three-dimensional (3D) coordinates of a plurality of joints included in an articulated object using an estimator according to example embodiments.

Final joint coordinates $Y = \{y_1, \ldots, y_j, \ldots y_{16} | \forall y \in R^3\}$ may be calculated using kinematic joint refinement. A distribution of vector sets may be used. Referring to FIG. 10, when a first patch 1020 is input into an estimator 1010, a first vector set 1040 may be obtained. When a second patch 1030 is input into the estimator 1010, a second vector set 1050 may be obtained.

3D coordinates 1060 of sixteen joints included in the first patch 1020 may be calculated based on a location of the first patch 1020 and the first vector set 1040. 3D coordinates 1070 of sixteen joints included in the second patch 1030 may be calculated based on a location of the second patch 1030 and the second vector set 1050.

A 2-part GMM may be generated for each of the sixteen joints. For example, a j-th 2-part GMM 1090 may be generated using the plurality of 3D coordinates 1080 corresponding to a j-th joint. The 3D coordinates 1080 corresponding to the j-th joint may be applied to a 2-part GMM $$\hat{\mathcal{G}}_j = \{\hat{\mu}_j^1, \hat{\Sigma}_j^1, \hat{\rho}_j^1, \hat{\mu}_j^2, \hat{\Sigma}_j^2, \hat{\rho}_j^2\}, \hat{\mu}, \hat{\Sigma}, \text{ and } \hat{\rho}$$

denote an average, a variance, and a weight of a Gaussian component, respectively. When the plurality of 3D coordinates corresponding to the j-th joint gathers in a single uniform cluster, a Gaussian component having a high weight and a low variance may be derived in the 2-part GMM. Conversely, when the plurality of 3D coordinates corresponding to the j-th joint disperses, a plurality of Gaussian components having similar variances may be derived, and averages of each Gaussian component may differ.

Whether the 2-part GMM corresponding to the j-th joint corresponds to a high-confidence joint may be determined based on whether an average of a first Gaussian component and an average of a second Gaussian component included in the 2-part GMM corresponding to the j-th joint are less than a threshold value $t_q$. Referring to Equation 7, in a case of a high-confidence joint, a joint location $y_j$ to be output may be determined based on an average of a Gaussian component having a higher weight, between the first Gaussian component and the second Gaussian component included in the 2-part GMM corresponding to the j-th joint.

$$y_j = \begin{cases} \hat{\mu}_j^1 & \text{if } \|\hat{\mu}_j^1 - \hat{\mu}_j^2\|_2^2 < t_q \text{ and } \hat{\rho}_j^1 \geq \hat{\rho}_j^2 \\ \hat{\mu}_j^2 & \text{if } \|\hat{\mu}_j^1 - \hat{\mu}_j^2\|_2^2 < t_q \text{ and } \hat{\rho}_j^1 < \hat{\rho}_j^2 \end{cases} \quad \text{[Equation 7]}$$

In Equation 7, $\|\hat{\mu}_j^1 - \hat{\mu}_j^2\|_2^2 < t_q$ is a comparative expression to determine whether the averages of the first Gaussian component and the second Gaussian component included in the 2-part GMM are less than the threshold value $t_q$. When $\hat{\rho}_j^1 \geq \hat{\rho}_j^2$, a weight of the first Gaussian component may be higher and thus, the average $\hat{\mu}_j^1$ of the first Gaussian component may be determined to be a value of $y_j$. When $\hat{\rho}_j^1 < \hat{\rho}_j^2$, a weight of the second Gaussian component may be higher and thus, the average $\hat{\mu}_j^2$ of the second Gaussian component may be determined to be the value of $y_j$.

Using the aforementioned scheme, 3D coordinates of the high-confidence joint may be determined. Hereinafter, a method of determining 3D coordinates of a low-confidence joint will be described in detail. Among kinematic models $\mathcal{G}_a$ pre-established using Algorithm 1, a kinematic model $\mathcal{G}_a$ corresponding to a viewpoint a of the low-confidence joint may include N averages $\{\mu_a^1 \ldots \mu_a^N\}$. Among the N averages, a nearest neighbor of vector sets of high-confidence joints may be detected. The nearest neighbor of the vector set of high-confidence joints may be detected using least square sum.

The 3D coordinates of the low-confidence joint may be calculated based on a Gaussian component $\{\mu_a^{nn}, \Sigma_a^{nn}\}$ detected as the nearest neighbor. One of a first Gaussian component and a second Gaussian component included in a 2-part GMM corresponding to a low-confidence joint j may be selected using Equation 8.

$$\{\tilde{\mu}, \tilde{\Sigma}\} = \underset{\{\mu, \Sigma\} \in \{\hat{\mu}_j^1, \hat{\Sigma}_j^1\}, \{\hat{\mu}_j^2, \hat{\Sigma}_j^2\}}{\operatorname{argmin}} \|\mu - \mu_a^{nn}[j]\|_2^2 \quad \text{[Equation 8]}$$

Figure 11:
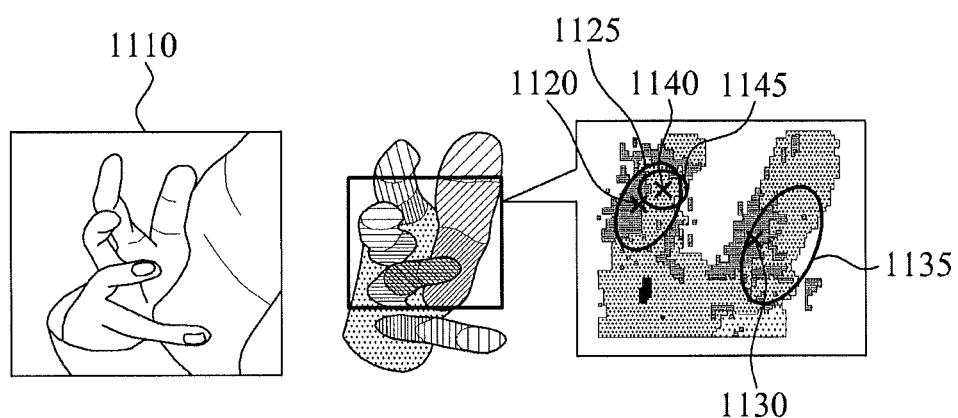
FIG. 11 illustrates an operation of calculating 3D coordinates of a low-confidence joint according to example embodiments.

One of the first Gaussian component $\{\hat{\mu}_j^1, \hat{\Sigma}_j^1\}$ and the second Gaussian component $\{\hat{\mu}_j^2, \hat{\Sigma}_j^2\}$ may be selected based on the Gaussian component $\{\mu, \Sigma\}$ of the low-confidence joint j. A Gaussian component closer to a j-th element $\mu_a^{nn}[j]$ of the average $\mu_a^{nn}$ of the Gaussian components detected as the nearest neighbor of the high-confidence joints may be selected. Referring to FIG. 11, among sixteen joints included in a hand 1110 of an actual user, a middle joint of an index finger is obscured by a middle finger. In this example, the middle joint of the index finger may be classified as a low-confidence joint.

A 2-part GMM corresponding to the middle joint of the index finger corresponding to the low-confidence joint may include a first Gaussian component and a second Gaussian component. An average of the first Gaussian component may correspond to a point 1120, and a variance of the first Gaussian component may correspond to an area 1125. An average of the second Gaussian component may correspond to a point 1130, and a variance of the second Gaussian component may correspond to an area 1135. An average of a Gaussian component detected as a nearest neighbor of high-confidence joints may correspond to a point 1140, and a variance thereof may correspond to an area 1145. In this example, the point 1120 may be closer to the point 1140 than the point 1130. Accordingly, the first Gaussian component may be selected between the first Gaussian component and the second Gaussian component.

In addition, the 3D coordinates of the low-confidence joint may be calculated based on a Gaussian component selected in the low-confidence joint and a Gaussian component detected as a nearest neighbor of high-confidence joints. For example, the 3D coordinates of the low-confidence joint may be calculated using Equation 9.

$$y_j = \left(\tilde{\Sigma} + \sum_{\tilde{a}}^{nn}[j]\right)^{-1}\left(\tilde{\Sigma}\mu_{\tilde{a}}^{nn}[j] + \sum_{\tilde{a}}^{nn}[j]\tilde{\mu}\right) \quad \text{[Equation 9]}$$

In Equation 9, $\tilde{\mu}$ and $\tilde{\Sigma}$ denote an average and a variance of a Gaussian component selected in a low-confidence joint j, respectively. $\mu_{\tilde{a}}^{nn}[j]$ denotes a j-th element of an average $\mu_{\tilde{a}}^{nn}$ of a Gaussian component detected as a nearest neighbor of high-confidence joints. $\Sigma_{\tilde{a}}^{nn}[j]$ denotes a j-th element of a variance $\Sigma_{\tilde{a}}^{nn}$ of the Gaussian component detected as the nearest neighbor of the high-confidence joints. 3D components $y_j$ of the low-confidence joint may be calculated by calculating a weighted sum of the Gaussian component selected in the low-confidence joint j and the Gaussian component detected as the nearest neighbor of the high-confidence joints.

A procedure of refining a pose may be arranged using Algorithm 2 of Table 2.

TABLE 2

Algorithm 2: Pose Refinement

Data: Vote vectors obtained from passing down the testing image to the STR forest.
Result: The output pose Y : $\mathbb{R}^{3 \times 16}$.
1   foreach Set of voting vectors for the j-th joint do
2   |      Learn a 2-part GMM $\hat{\mathcal{G}}_j$ of the voting vectors.
3   |      if $\|\hat{\mu}_j^1 - \hat{\mu}_j^2\|_2^2 < t_q$ then
4   |      |      The j-th joint is a high-confidence joint.
5   |      |      Compute the j-th joint location. (Equation 7)
6   |      else
7   |      |      The j-th joint is a low-confidence joint.
8   Find the Gaussian $\{\mu_{\tilde{a}}^{nn}, \Sigma_{\tilde{a}}^{nn}\}$ by finding the nearest neighbour of the high-confidence joints in $\mathcal{G}_{\tilde{a}}$
9   Update the remaining low-confidence joint locations. (Equation 8 and 9)

Input data input into Algorithm 2 may correspond to a vector set derived as a result of inputting an input depth image into an estimator. An output of Algorithm 2 may correspond to a pose of an articulated object which may be output as 3D coordinates of a plurality of joints included in the articulated object. When the articulated object corresponds to a hand of a user, a total number of joints may be sixteen. In this example, the output Y of Algorithm 2 may have $R^{3 \times 16}$ metric dimensions.

The pose of the articulated object may be estimated in real time. For example, images of at least tens of frames may be processed per second. The pose of the articulated object may be estimated based on a frame unit. Degradation of pose estimation performance may be prevented by accumulating errors occurring in a predetermined frame.

Classified Image and Final Pose Image According to Example Embodiments

Figure 12:
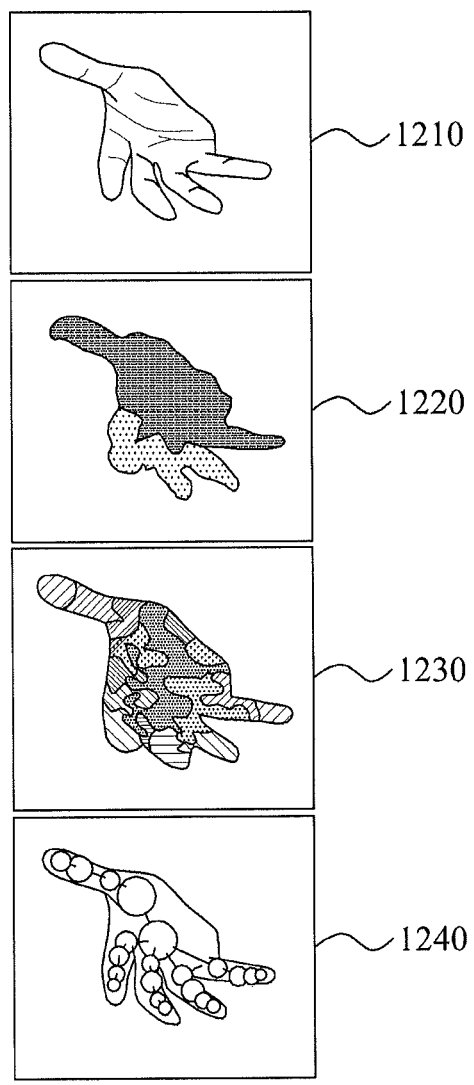
FIG. 12 illustrates images used to estimate a pose of a hand of a user according to example embodiments.

FIG. 12 illustrates images used to estimate a pose of a hand of a user according to example embodiments.

Referring to FIG. 12, a depth image 1220 in which a hand 1210 of an actual user is photographed may be received. By classifying the depth image 1220 based on a viewpoint and a joint, a classified image 1230 may be acquired. A final pose image 1240 may be acquired using regression and pose refinement. The final pose image 1240 may include information on locations of sixteen joints included in the hand of the user.

Figure 13:
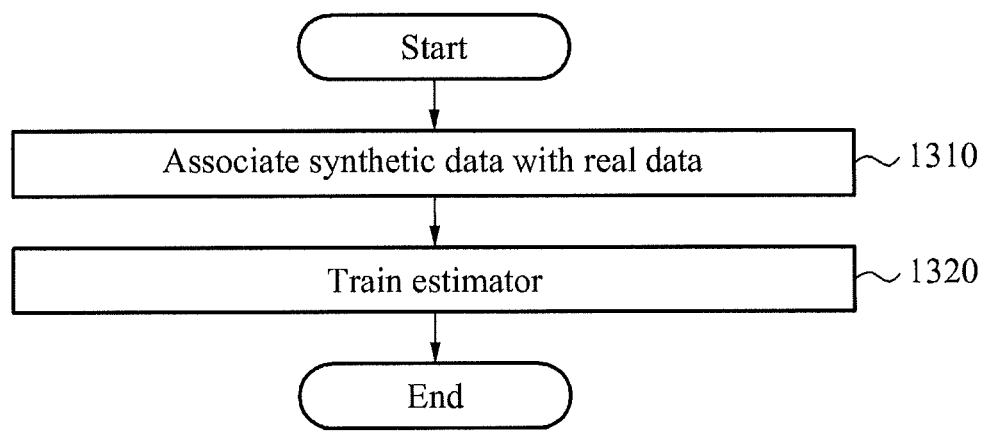
FIG. 13 illustrates a method of training an estimator according to example embodiments.

Estimator Training Method and Pose Estimating Method According to Example Embodiments FIG. 13 illustrates a method of training an estimator according to example embodiments.

Referring to FIG. 13, the estimator training method may include operation 1310 of associating synthetic data in which an object including joints is synthesized, with real data in which the object is photographed, and operation 1320 of training the estimator configured to estimate a pose of the object based on an association between the synthetic data and the real data.

Figure 14:
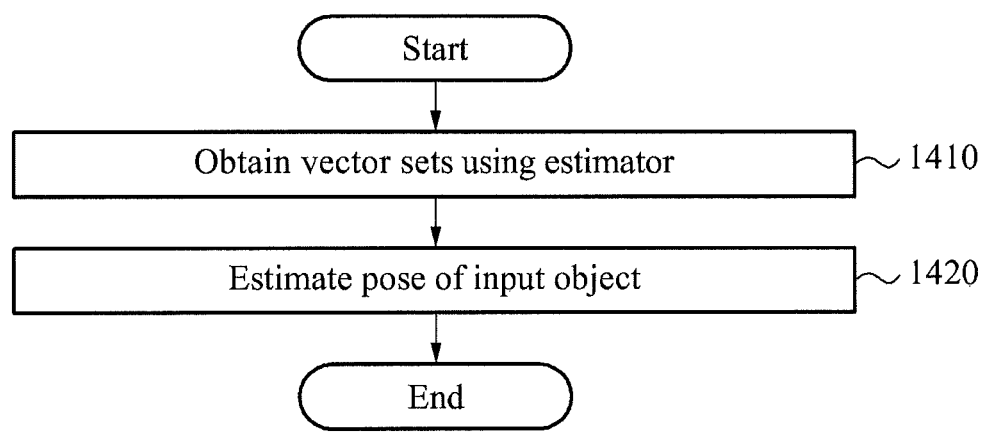
FIG. 14 illustrates a method of estimating a pose according to example embodiments.

FIG. 14 illustrates a method of estimating a pose according to example embodiments.

Referring to FIG. 14, the pose estimating method may include operation 1410 of obtaining a plurality of vector sets corresponding to a plurality of patches included in an input image using an estimator trained based on an association between synthetic data in which an object including joints is synthesized and real data in which the object is photographed, and operation 1420 of estimating a pose of an input object included in the input image based on the plurality of vector sets. Descriptions provided with reference to FIGS. 1 through 12 may apply to each operation of FIGS. 13 and 14 and thus, duplicated descriptions will be omitted for conciseness.

Figure 15:
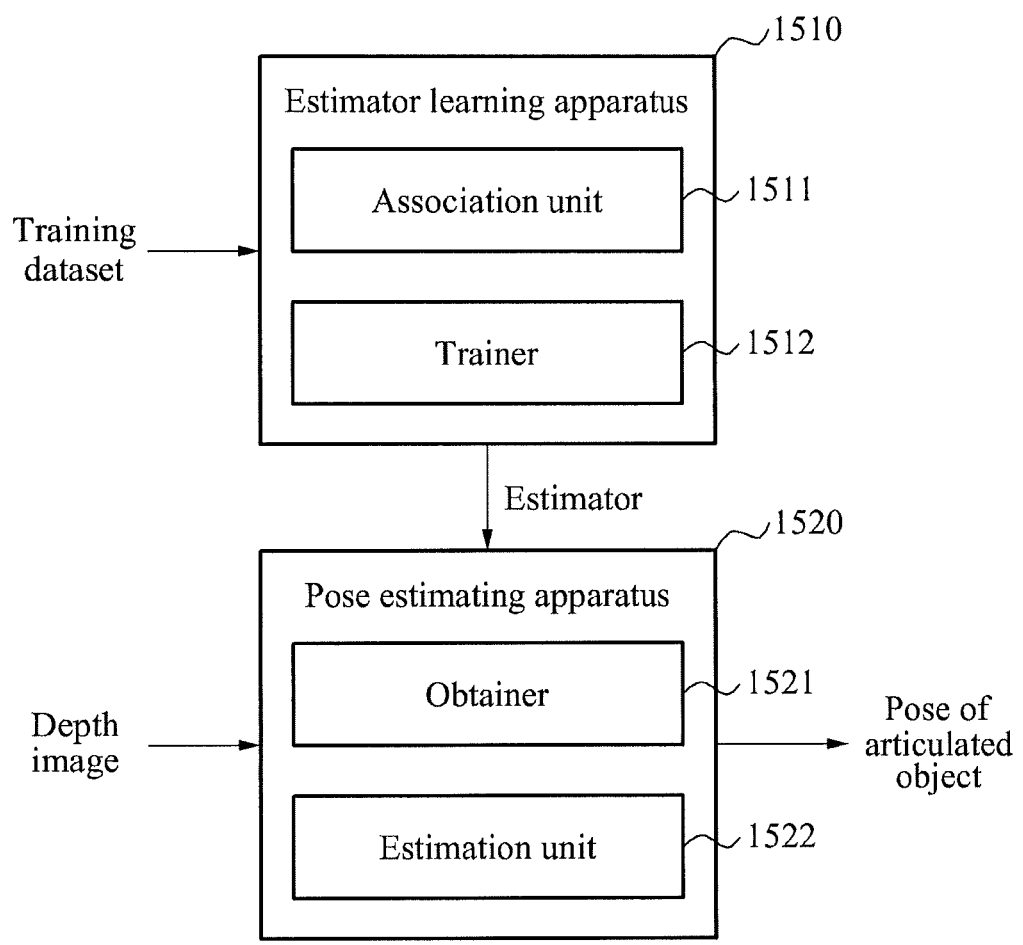
FIG. 15 illustrates an apparatus for training an estimator and an apparatus for estimating a pose according to example embodiments.

Estimator Training Apparatus and Pose Estimating Apparatus According to Example Embodiments FIG. 15 illustrates an estimator training apparatus 1510 and a pose estimating apparatus 1520 according to example embodiments. Referring to FIG. 15, the estimator training apparatus 1510 may include an association unit 1511 configured to associate synthetic data in which an object including joints is synthesized, with real data in which the object is photographed, and a Trainer 1512 configured to train the estimator configured to estimate a pose of the object, based on an association between the synthetic data and the real data. The pose estimating apparatus 1520 may include an obtainer 1521 configured to obtain a plurality of vector sets corresponding to a plurality of patches included in an input image using an estimator trained based on an association between synthetic data in which an object including joints is synthesized and real data in which the object is photographed, and an estimation unit 1522 configured to estimate a pose of an input object included in the input image based on the plurality of vector sets. Descriptions provided with reference to FIGS. 1 through 12 may apply to each module of FIG. 15 and thus, duplicated descriptions will be omitted for conciseness.

Figure 16:
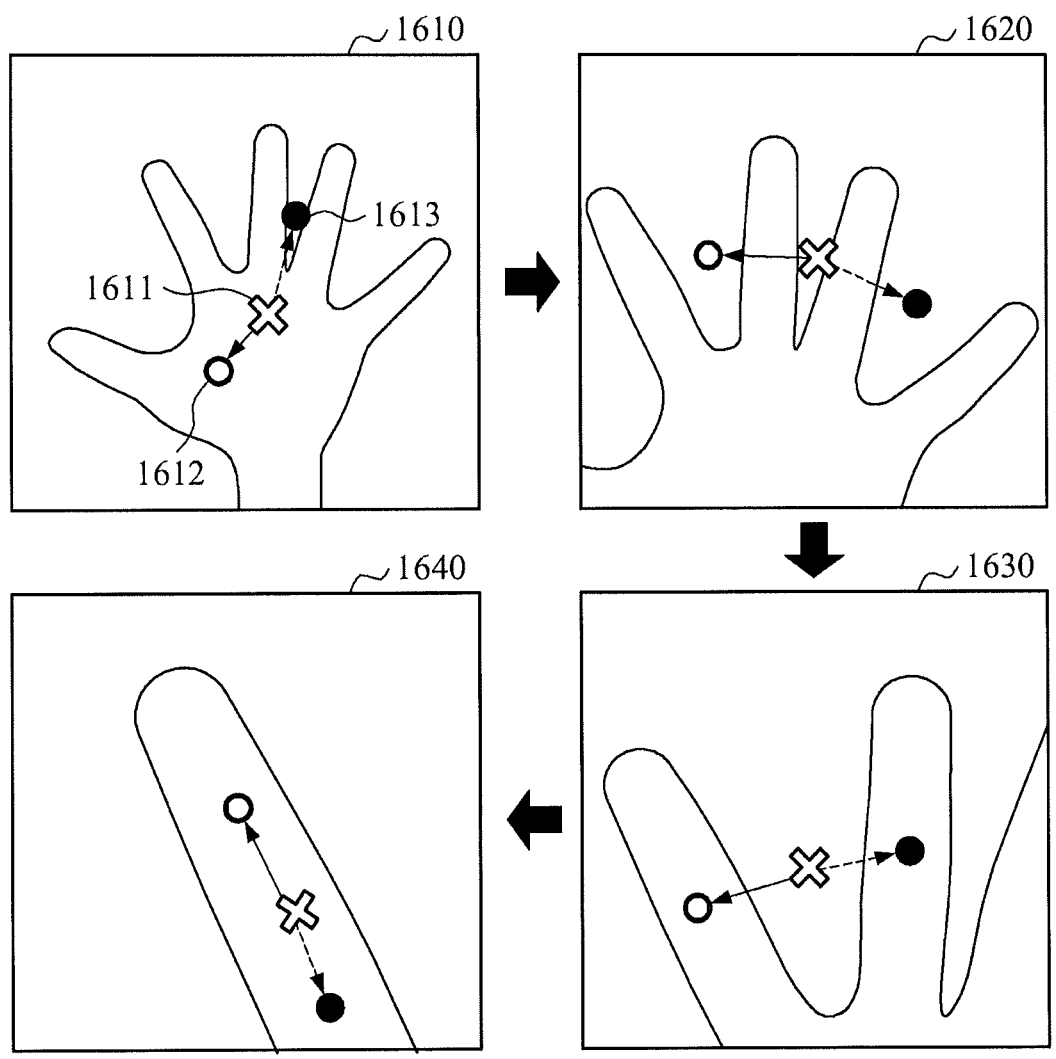
FIG. 16 illustrates a method of training an estimator using a latent regression forest (LRF)

Estimator Training Method Using Latent Regression Forest (LRF) According to Example Embodiments FIG. 16 illustrates a method of training an estimator using an LRF. Referring to FIG. 16, the estimator training method may be construed as a searching process. Two vectors may be generated at each level, starting from a center of mass of an object to locations of end joints. For example, at a first level 1610, a hand may be partitioned into a first sub-group {index finger, middle finger, ring finger, little finger} and a second sub-group {palm, thumb}. For such partitioning, at the first level 1610, a vector u having a direction from a center 1611 of the hand toward a center 1613 of the first sub-group, and a vector v having a direction from the center 1611 of the hand toward a center 1612 of the second sub-group may be derived. At a second level 1620, {index finger, middle finger, ring finger, little finger} corresponding to the first sub-group at the first level 1610 may be partitioned into a first-first sub-group of {index finger, middle finger} and a first-second sub-group of {ring finger, little finger}. At a third level 1630, {index finger, middle finger} corresponding to the first-first sub-group at the second level 1620 may be partitioned into a first-first-first sub-group of {index finger} and a first-first-second sub-group of {middle finger}. At a fourth level 1640, {index finger} corresponding to the first-first-first sub-group at the third level 1630 may be partitioned into {end segment of index finger, middle segment of index finger}.

The estimator may be trained using the LRF to partition an input image based on a level. The LRF may have a hierarchical tree structure in which many features may be contained in a single tree. The hierarchical tree structure may configure each tree constituting the LRF using nodes of a hierarchical step having different features and playing different roles. The LRF may correspond to a randomized regression tree guided by a latent tree model. The latent tree model will be described in detail.

Latent Regression Forest

Figure 17A:
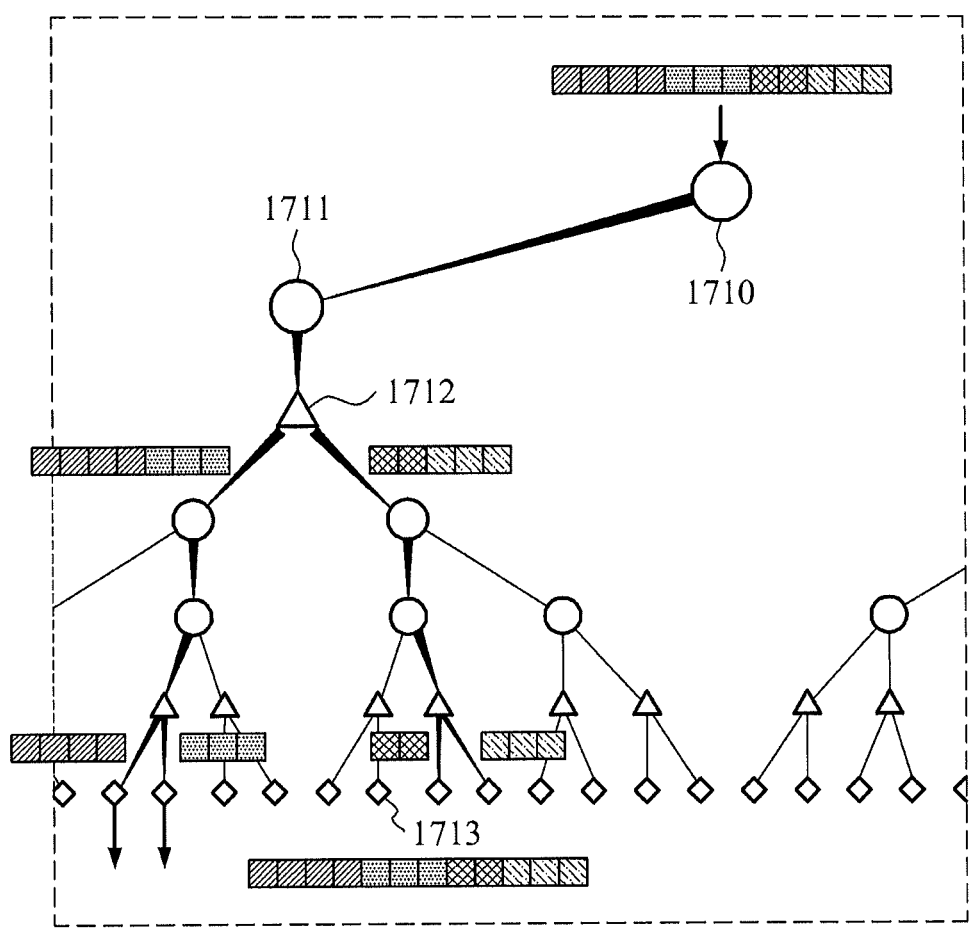
FIGS. 17A through 17C illustrate a comparison between a general regression forest and an LRF according to example embodiments.
Figure 17B:
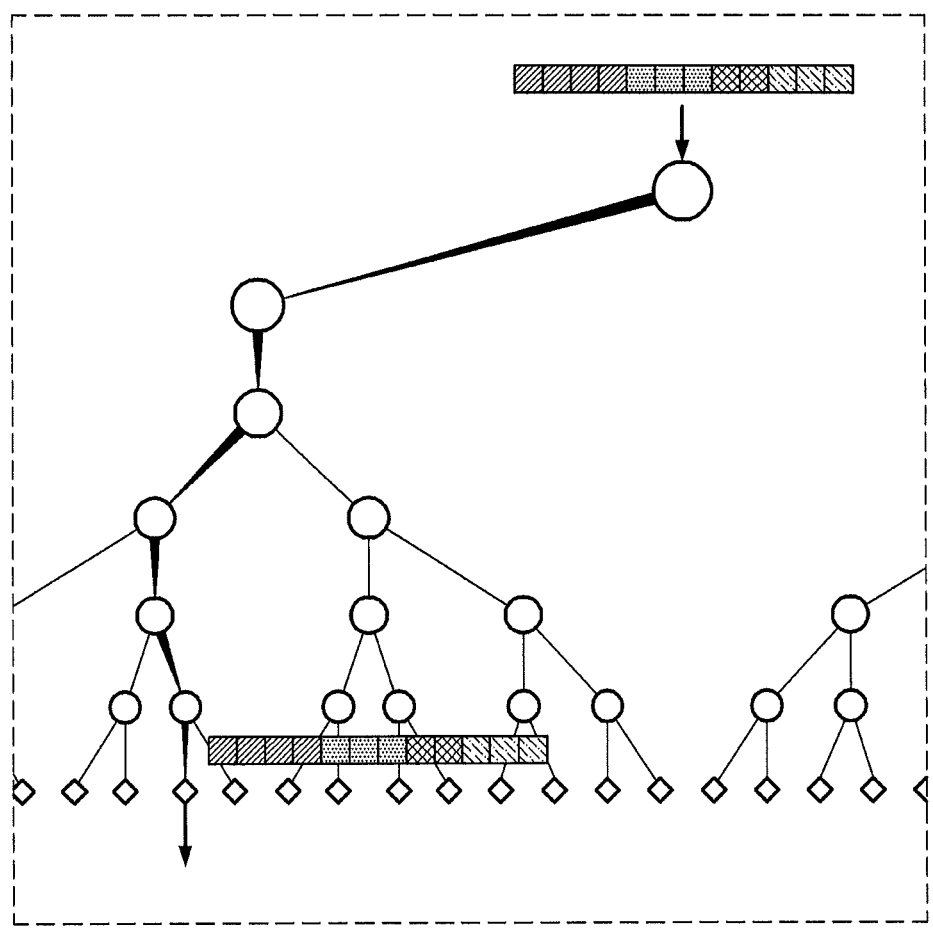
Figure 17C:
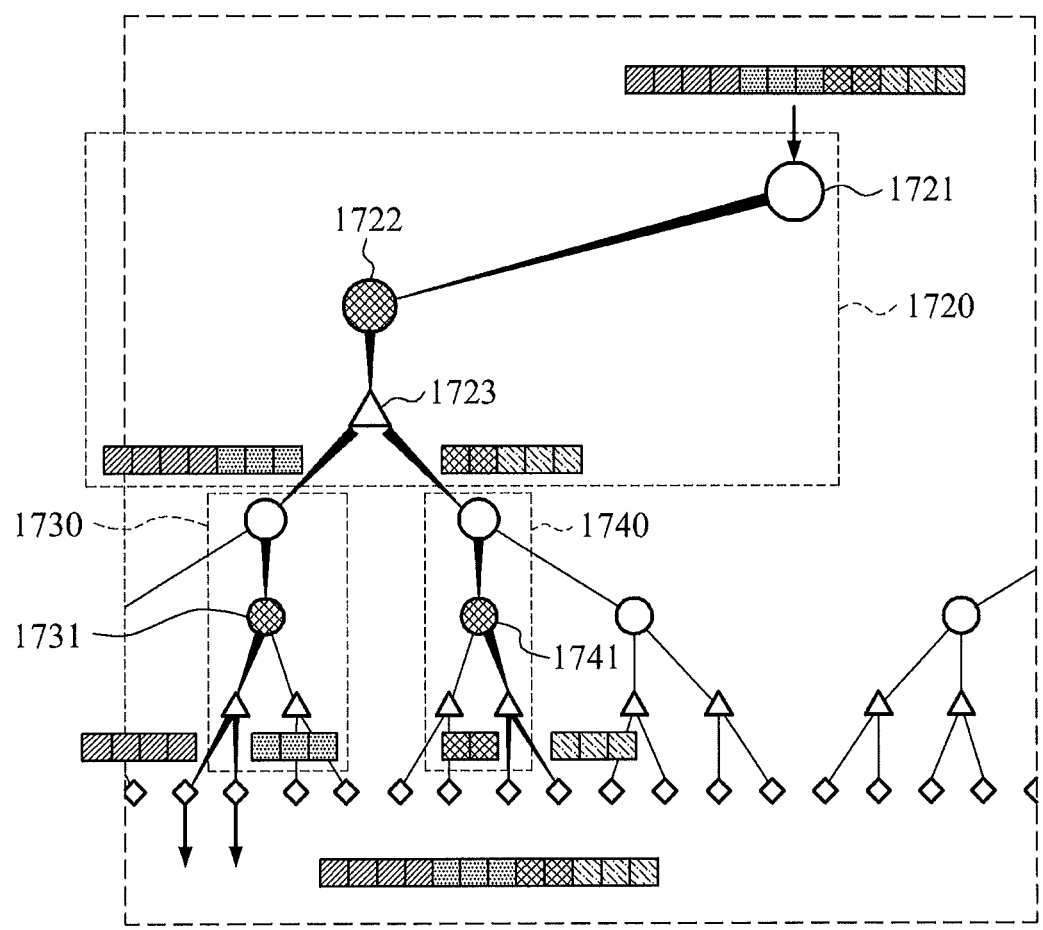

FIGS. 17A through 17C illustrate a comparison between a general regression forest and an LRF according to example embodiments. Referring to FIG. 17A, the LRF may be defined as a binary tree including a split node 1711, a division node 1712, and a leaf node 1713. The split node 1711 may perform a test function with respect to input data, and determine whether the input data is transferred to a left child node or a right child node. The division node 1712 may not perform a test function. Instead, the division node 1712 may generate two partitioned samples from samples arriving from a split node. The leaf node 1713 may output samples corresponding to a single part of an object.

In contrast to a general regression forest, the LRF may partition a sample input at a root node into many parts. For example, the sample input at the root node may be partitioned into many parts based on a predetermined latent tree model, and the partitioned parts may propagate down a tree in parallel and be transferred to different leaf nodes. A sample input at a root node 1710 may be partitioned at the division node 1712, and corresponding partitioned parts may be transferred to the leaf node 1713. Conversely, referring to FIG. 17B, the general regression forest may not partition a sample input at a root node. The entire input sample may propagate down a tree and be transferred to a single leaf node.

Referring to FIG. 17C, an error regression node may be included at each level in the LRF. For example, at a first level 1720, a split node 1721, an error regression node 1722, and a division node 1723 may be included. At a second level 1730, an error regression node 1731 may be included between a split node and a division node. At a second level 1740, an error regression node 1741 may be included between a split node and a division node. An advantage of a hierarchical structure of the LRF may lie in overall efficiency. However, a result at each level may depend on a result at a previous level, errors may be accumulated critically until an input sample arrives at a leaf node. An error regression node included in each layer may prevent an accumulation of errors. In addition, using the error regression node, an amount of training datasets to be used to train the estimator may be reduced. The error regression node will be described in detail later.

Hereinafter, a latent tree model will be described, and a result of modeling a hand structure using the latent tree model will be described. In addition, a method of generating an LRF by including a learned latent tree model in a regression forest will be described in detail.

Latent Tree Model

Figure 18:
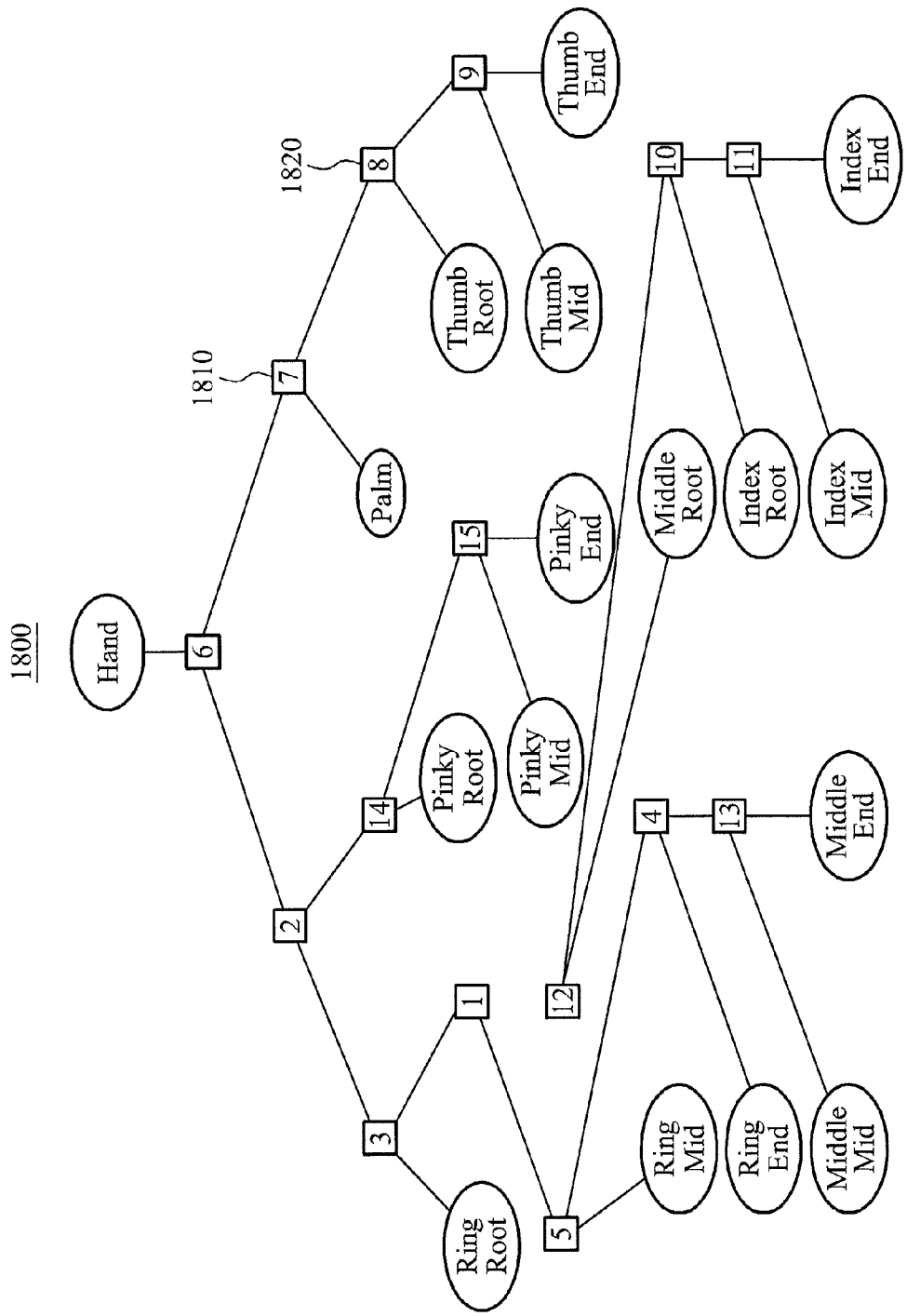
FIGS. 18 and 19 illustrate latent tree models according to example embodiments.

FIG. 18 illustrates a latent tree model 1800 according to example embodiments. Referring to FIG. 18, the latent tree model 1800 may be generated adaptively in a form in which respective parts of a hand are included in leaf nodes. The hand may be classified into a total of sixteen parts. The sixteen parts may include three segments of each of the thumb and four fingers, and a palm. The latent tree model 1800 may include a root node, a latent node, and an observation node. The observation node may refer to a node corresponding to an observable part of an object. All leaf nodes of the latent tree mode 1800 may correspond to observation nodes. The latent node may refer to a node corresponding to a bundle of at least two parts. All middle nodes of the latent tree mode 1800 may correspond to latent nodes. For example, a latent node 1810 may be a node corresponding to {palm, thumb}, and a latent node 1820 may be a node corresponding to {end segment of thumb, middle segment of thumb, root segment of thumb}. In FIG. 18, circular nodes may correspond to observation nodes, and rectangular nodes may correspond to latent nodes. When the latent tree model 1800 is applied to a hierarchical structure of the LRF, the LRF may have a tree structure optimized for characteristics of learning data.

Generation of Latent Tree Model

The latent tree model 1800 may be generated using a latent structure learned directly from data. By expressing a relationship among variables constituting observable data as a tree structure using a non-directional graph model, leaf nodes corresponding to observation nodes may be generated. By generating latent variables automatically, as necessary, to express an accurate relationship, middle nodes corresponding to latent nodes may be generated. For example, a latent tree model may be generated based on actually obtained information data related to locations of sixteen parts of a hand, for example, the palm and the thumb. A distance matrix of each observation node may be configured using a relative Euclidean distance value of the sixteen parts of the hand. The automatically generated latent tree model may include a structural feature and a kinematic constraint of the hand.

Figure 19:
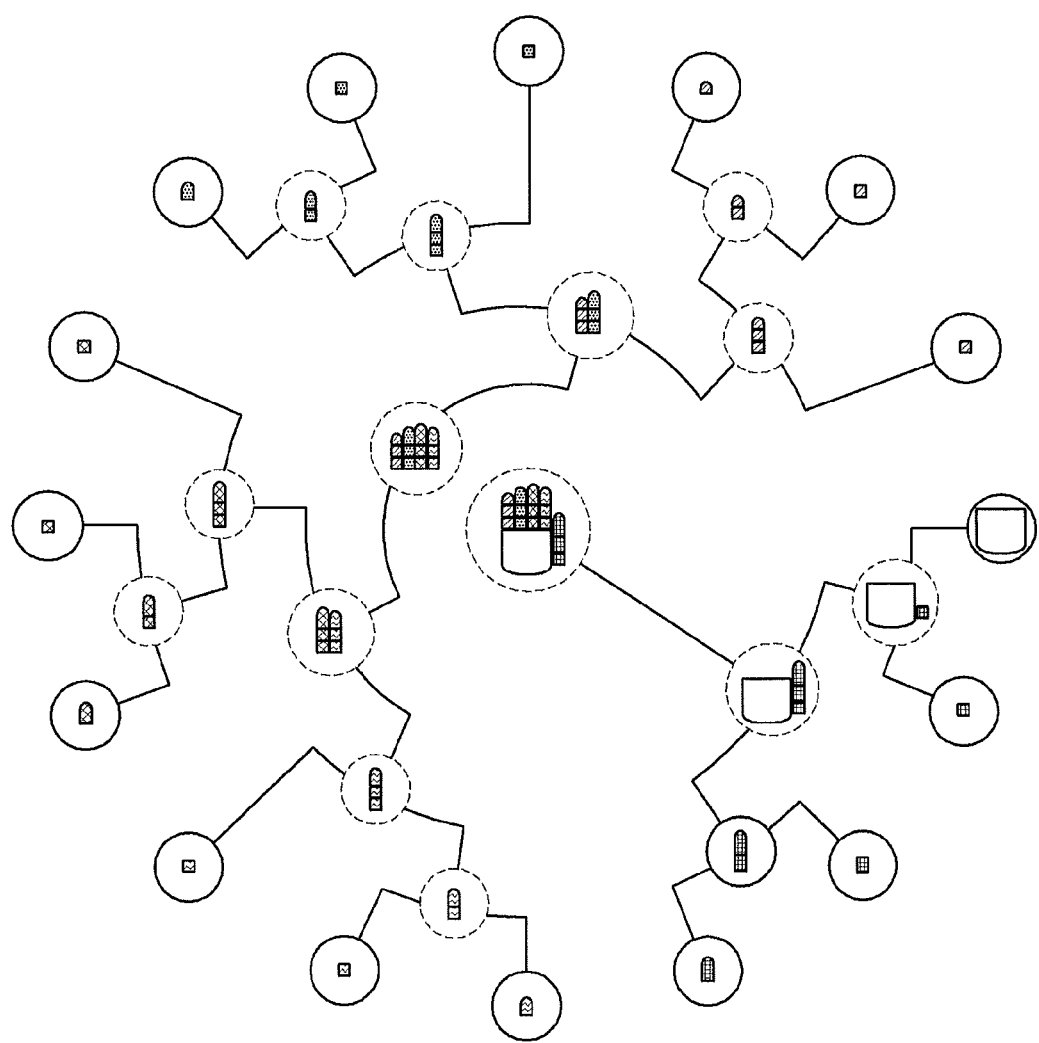

The latent tree model may refer to a graphic model of a tree structure including latent variables. The latent tree model may be modeled to T=(V=O U H, E). Here, O denotes observation nodes, and H denotes hidden nodes. The observation nodes may correspond to leaf nodes each being a single node. The hidden nodes may correspond to middle nodes each being a compositional node. E denotes an edge. In the latent tree model, all observation nodes may be positioned at leaf nodes. The observation nodes may correspond to a final output of the latent tree model. In addition, the latent tree model may correspond to a binary tree. When the latent tree model corresponds to a binary model, the latent tree model may be naturally integrated with a random forest having a binary structure. In addition, when the latent tree model corresponds to a binary tree, an optimization target may be simplified at each level. Referring to FIG. 19, a binary latent tree model may be expressed by a circular tree layout. In FIG. 19, nodes indicated using a solid line may correspond to observation nodes, and nodes indicated using a broken line may correspond to latent nodes.

The binary latent tree model may be generated based on an algorithm for generating a phylogenetic tree in biology. When a matrix of pairwise distances between species is provided, the algorithm for generating the phylogenetic tree may generate a tree to describe an ancestral relationship between the species. A tree layout algorithm may be employed to display a resulting hierarchy.

To generate the binary latent tree model, a pairwise Euclidean distance matrix d of the sixteen parts of the hand may be used. Based on the distance matrix d, degrees of similarity or levels of similarity among the sixteen parts of the hand may be inferred from branches and sub-branches in a tree view.

To generate the binary latent tree model, a minimum spanning tree (MST) (V;d) may be constructed from a set of observation nodes V based on the distance matrix d. A neighbor join (NJ) scheme may be applied to reconstruct a latent sub-tree using closed neighborhood of all internal nodes in the MST (V;d). The binary latent tree model may be learned through operations listed in Table 3.

TABLE 3

1. Construct the minimum spanning tree T = MST(V;d);
2. Identify the set of internal nodes in MST(V;d);
3. For each internal node i, let nbd[i;T] be its closed neighborhood in T and let S = NJ(nbd[i;T];d) be the output of NJ with nbd[i;T] as the set of input nodes;
4. Replace the sub-tree over node set nbd[i;T] in T with S. Denote the new tree as T.
5. Repeat steps 3 and 4 until all internal nodes have been operated on.

Training of Latent Regression Forest

Figure 20A:
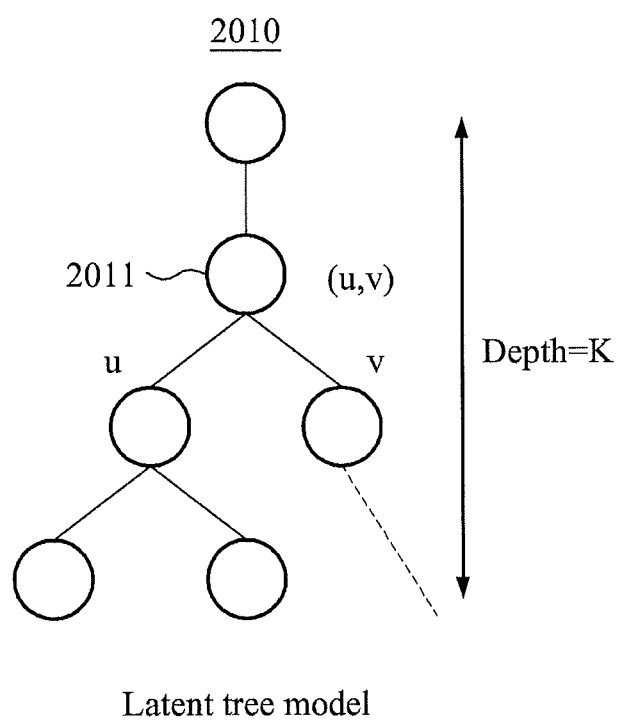
FIGS. 20A and 20B illustrate a method of training an LRF according to example embodiments.
Figure 20B:
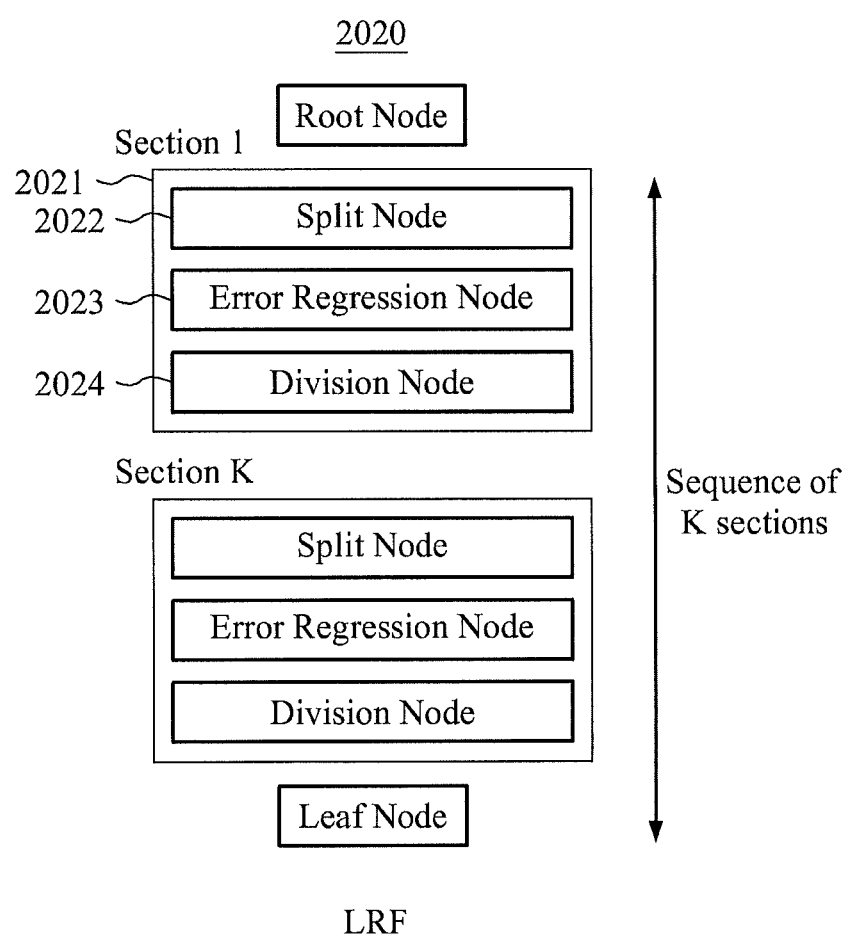

FIGS. 20A and 20B illustrate a method of training an LRF according to example embodiments. Referring to FIGS. 20A and 20B, a latent tree model 2010 illustrates the latent tree model 1800 of FIG. 18. The latent tree model 2010 may include the plurality of latent nodes and the plurality of leaf nodes included in the latent tree model 1800. An LRF 2020 may be guided by the latent tree model 2010, and be generated in a breadth-first manner. An overall structure of the LRF 2020 may be substantially the same as a hierarchical tree structure of the latent tree model 2010. The LRF 2020 may include sections corresponding to the latent nodes of the latent tree model 2010. A vector pair (u, v) that branches to two child nodes at a latent node of the latent tree model 2010 may be implemented by a corresponding section of the LRF 2020. The plurality of sections included in the LRF 2020 may be generated through a training process to be described later.

Each of the plurality of sections included in the LRF 2020 may include a split node and a division node. For example, a first section 2012 of the LRF 2020 may include a split node 2022 and a division node 2024. The first section 2021 of the LRF 2020 refers to a section disposed immediately below a root node, and may correspond to a latent node 2011 disposed immediately below a root node in the latent tree model 2010. The plurality of sections included in the LRF 2020 may be trained based on an algorithm of Table 4.

TABLE 4

| | |
|---|---|
| Data: | A set of segmented hand samples X; a learned LTM M |
| Result: | A Latent Regress Tree T |
| 1. | For each sample $x_j \in X$, compute the centre of mass $c_j$. |
| 2. | Randomly propose a set of 2-pixel tests φ with respect to $c_j$. |
| 3. | Recursively partition X into left and right subsets by each φ. |
| 4. | Find the optimal φ* and corresponding partition by minimising the intra-subset variance of u and v: $$\phi^* = \operatorname*{argmin}_{\phi} \sum_{c \in l,r} \sum_{i \in X_c} \|u_i - \bar{u}_c\|_2^2 + \|v_i - \bar{v}_c\|_2^2$$ |
| 5. | Repeat step 2-4 until var(u) + var(v) < τ. |
| 6. | Create a Division node for current layer. Divide samples into left and right sets by $X_l = \{u_i\}$, $X_r = \{v_i\}$, |
| 7. | Recursively repeat step 2-6 until reaching the leaf nodes of M |

A training dataset X and a latent tree model M may be used as an input of the algorithm. An output of the algorithm may correspond to a latent regression tree T. An LRF according to example embodiments may correspond to a forest data structure including a plurality of LRFs.

Referring to Table 4, in operation 1, a center $c_j$ of each sample $x_j$ included in X may be calculated. Since the latent tree model may partition data based on a central point, centers of the samples may be calculated initially in operation 1. In operation 2, a set of 2-pixel tests φ may be selected based on each center $c_j$. For example, a 2-pixel test $\phi_j$ with respect to the center $c_j$ of the sample $x_j$ may correspond to a vector pair $(u_j, v_j)$. The 2-pixel test φ may be generated by selecting, at random, two vectors having different directions from the center $c_j$. In operation 3, X may be partitioned into two subsets by each 2-pixel test φ. For example, the sample $x_j$ may be partitioned into a first subset having a direction of vector $u_j$ and a second subset having a direction of vector $v_j$, based on the center $c_j$. Hereinafter, $X_l$ may denote a set of first subsets, and $X_r$ may denote a set of second subsets. In operation 4, an optimal 2-pixel test φ* may be selected in a set of the 2-pixel tests φ. Through an equation provided in operation 4, an optimal 2-pixel test φ* that minimizes an intra-subset variance corresponding to a sum of variances of the vector u and the vector v in each subset may be selected. In operation 5, whether the intra-subset variance by the optimal 2-pixel test φ* has a value less than a predetermined threshold value may be examined. When the intra-subset variance by the optimal 2-pixel test φ* has a value greater than or equal to the predetermined threshold value, operations 2 to 4 may be repeated. In operation 6, a division node may be generated. The division node may partition X into $X_l$ and $X_r$.

In operation 7, operations 2 to 6 may be repeated. Each time operations 2 to 6 are repeated, a single section included in the LRF 2020 may be generated. A leaf node of the LRF 2020 may correspond to a final node at which the input data may not be branched any further. Accordingly, when the input data reaches a leaf node according to a hierarchical structure of the latent tree model 2010, a branch node may not be generated any further.

Error Regression Node

In general, while learning of a random forest is performed, a training dataset may not be changed. For example, when a tree included in the random forest is learned using 1000 training datasets, all 1000 items of data may be used throughout all depths of the tree.

An LRF using an error regression node may correct errors while increasing a quantity of data to be used for the learning as a depth of the tree increases. For example, when a depth of a pre-learned latent tree model corresponds to K, for example, K=10, the training dataset including the 1000 items of data to be used for training the LRF may be divided into K subsets. In this example, each subset may include 100 items of data.

In the hierarchical structure of the LRF, a first section may be learned using 100 datasets. A lower section may use another 100 datasets additionally and thus, may be learned while correcting errors in a training result of the previous section. Accordingly, a number of comparison operations to be used for training the LRF may be reduced greatly, and a computational efficiency may increase.

Each of the plurality of sections included in the LRF 2020 may include a split node, an error regression node, and a division node. For example, the first section 2021 of the LRF 2020 may include the split node 2022, an error regression node 2023, and the division node 2024. The plurality of sections included in the LRF 2020 may be trained based on an algorithm of Table 5.

TABLE 5

| | |
|---|---|
| Data: | A set of segmented hand samples X; a learned LTM M |
| Result: | A Latent Regress Tree T |
| 1. | Randomly divide X into K different subsets $X_0 \ldots X_K$ with equal sizes, where K is the maximum depth of M. |
| 2. | For each sample $x_j \in X_i$, compute the centre of mass $c_j$. |
| 3. | Randomly propose a set of 2-pixel test φ with repsect to $c_j$. |
| 4. | Recursively partition $X_i$ into left and right subsets by each φ. |
| 5. | Find the optimal φ* and corresponding partition by minimising the intra-subset variance of u and v: $$\phi^* = \operatorname*{argmin}_{\phi} \sum_{c \in l,r} \sum_{i \in X_c} \|u_i - \bar{u}_c\|_2^2 + \|v_i - \bar{v}_c\|_2^2$$ |
| 6. | Repeat step 3-5 until var(u) + var(v) < τ. |
| 7. | Pass $X_{i+1}$ down the existing layers, when each sample arrives at an end node, measure the error between predicted centres and ground-truth by two error offset vectors α and β. |
| 8. | Randomly propose a set of 2-pixel tests φ with respect to $c_j$. |
| 9. | Recursively partition $X_i$ into left and right subsets by each φ. |
| 10. | Find the optimal φ* and corresponding partition by minimising the error variance of α and β: $$\phi^* = \operatorname*{argmin}_{\phi} \sum_{c \in l,r} \sum_{i \in X_c} \|\alpha_i - \bar{\alpha}_c\|_2^2 + \|\beta_i - \bar{\beta}_c\|_2^2$$ |
| 11. | Repeat step 8-11 until var(α) + var(β) < τ. |
| 12. | Create a Division node for current layer. Divide samples into left and right sets by $X_l = \{m_i + u_i\}$, $X_r = \{m_i + v_i\}$, |
| 13. | Recursively repeat step 3-12 until reaching the leaf nodes of M |

The training set may include a set of tuples (n, d, u, v). "n" denotes a latent tree node which a sample belongs to, "d" denotes a depth patch, and "u" and "v" denote vectors having directions toward centers of two child nodes.

Training for each section of the LRF 2020 may be, by and large, divided into three operations. Referring to Table 5, through operations 2 to 6, a tree for a split node may be generated until a suspension standard with respect to the split node is satisfied. Through operations 7 to 11, a tree for an error regression node may be generated until a suspension standard with respect to the error regression node is satisfied. Through operation 12, a division node may be generated. When a split node, an error regression node, and a division node are generated with respect to a single section, a similar process may be repeated with respect to a subsequent section. When a split node, an error regression node, a division node are generated with respect to every section, the generation of the LRF may be terminated.

Referring to Table 5, in operation 1, when a depth of the latent tree model corresponds to K, a training dataset X may be partitioned into K subsets. For example, a split node at a first level may be generated using a first subset. An error regression node at the first level may be generated using a second subset. In this example, a split node at a second level may be generated using the second subset, and an error regression node at the second level may be generated using a third subset. Similarly, a split node at a (K−1)-th level may be generated using a (K−1)-th subset, and an error regression node at the (K−1)-th level may be generated using a K-th subset. Since the depth of the latent tree model corresponds to K, leaf nodes may be disposed at a K-th level.

In operation 2, a center $c_j$ of each sample $x_j$ included in an i-th subset $X_i$ may be calculated. In operation 3, a set of 2-pixel tests ϕ with respect to $c_j$ may be generated at random. A 2-pixel test ϕ may include a vector pair (u, v). In operation 4, the i-th subset $X_i$ may be partitioned by each 2-pixel test ϕ into a left subset and a right subset. In operation 5, an optimal 2-pixel test ϕ* that minimizes an intra-subset variance, and a result of partitioning performed by the optimal 2-pixel test ϕ* may be detected. In operation 6, operations 3 to 5 may be repeated until a sum of a variance of the vector u and a variance of the vector v is less than a predetermined threshold value τ. When operation 6 is completed, generation of a split node with respect to the i-th section may be completed.

In operation 7, an (i+1)-th $X_{i+1}$ may be transferred to an end node along a layer. At the end node, an error between a predicted center and a ground-truth may be measured by two error offset vectors α and β. The predicted center may correspond to a center of a first partition and a center of a second partition of the $X_i$ partitioned by (u, v) of the split node. The ground-truth may correspond to a center of a first partition and a center of a second partition of the $X_{i+1}$ partitioned by (u, v) of the split node. The error offset vector α may indicate a difference between the centers of the first partitions, and the error offset vector β may indicate a difference between the centers of the second partitions.

In Table 5, operations 8 through 11 may be similar to operations 3 through 6. In operations 8 through 11, ϕ of (α, β) may be used in lieu of ϕ of (u, v). In operation 10, an optimal 2-pixel test ϕ* that minimizes an error variance of (α, β) may be detected. When operation 11 is completed, generation of an error regression node with respect to the i-th section may be completed.

In operation 12, generation of a division node with respect to the i-th section may be completed based on a result of partitioning data through the split nod and the error regression node. For example, a vector pair (α+u, β+v) may be generated based on a combination of (u, v) of the split node and (α, β) of the error regression node. The generated vector pair may have directions toward centers of two child nodes of the division node. In operation 13, operations 3 to 12 may be repeated with respect to remaining sections, whereby generation of the LRF 2020 may be completed.

Technical Effects of Latent Tree Model and Latent Repression Forest

A topological structure of hand parts may be modeled using a latent tree model. A structure of a hand and a kinematic constraint may be included in an LRF. The LRF may be trained using labeled ground-truth datasets. The labeled ground-truth dataset may be generated easily and accurately. With an increase in a computational efficiency, the LRF may include more trees and thus, a prediction performance of the LRF may increase.

An estimator using the LRF may estimate locations of all joints from centers of mass of input pixels based on the latent tree model, rather than estimating a joint location by classifying each input pixel separately. Since fingers are similar in terms of shape and size, the kinematic constraint may play a significant role in estimating finger poses. In addition, implementation of accurate pixel-wise ground-truth labeling may be difficult under a resolution of current motion capture technology. Accordingly, a center of each hand part may be labeled to generate a ground-truth hand pose dataset.

An estimator training method may integrate a latent tree model into a random forest without training intervention. Thus, the random forest may handle visual category issues naturally. Further, context information included in the latent tree model may be used to increase an accuracy of subsequent layers.

The estimator training method may employ implicit kinematics. A topological hand part structure may be adaptively generated by the latent tree model. The latent tree model may encode both flexible contextual information of hand parts and implicit kinematic constrains.

The estimator training method may increase a computational efficiency of random forest training, using a coarse-to-fine multi-layered structure. The latent tree model may use a skeleton as a tree structure. The latent tree model may be learned directly from observed variables. A distribution of joints in an observation result may be inferred by the latent tree model. Latent variables may be used as necessary.

The estimator training method may encode different levels of information into a single forest. The estimator training method may minimize a target to be optimized at each simplified level. The estimator training method may automatically learn a hierarchical structure in a data-driven manner. According to example embodiments, a cascade of error regression schemes may be integrated naturally and thus, the estimator may be trained more accurately.

Since the latent tree model may be modeled based on structure kinematic feature data of a hand, and training may be performed based on the latent tree model, a separate post-processing may be unnecessary. In particular, a separate post-processing module to apply structural features and kinematic constraints of the hand to classification or regression results may be unnecessary. Thus, an efficient estimator may be generated using a small amount of training data.

Pose Estimation Results Using Latent Regression Forest

Figure 21:
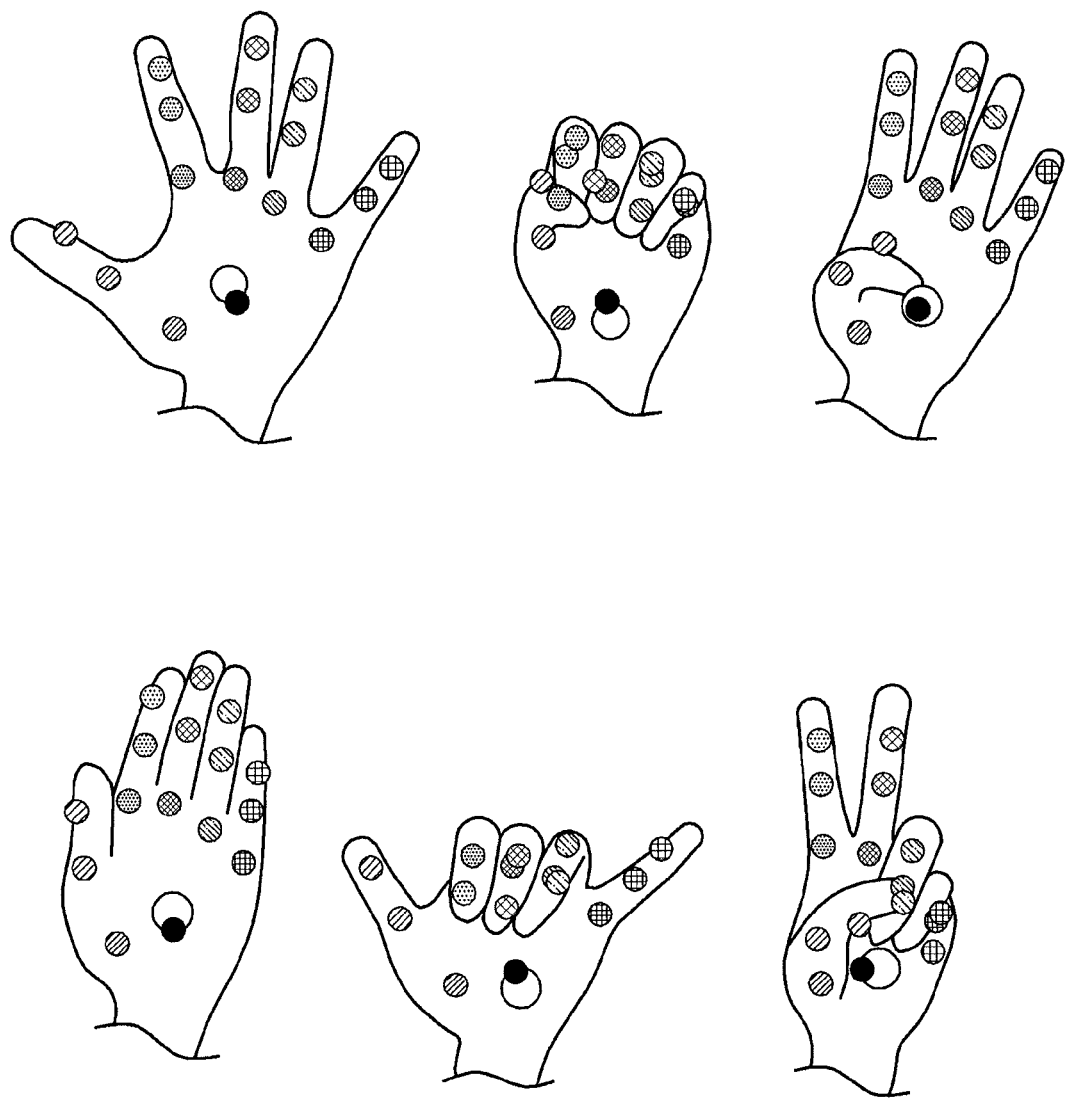
FIG. 21 illustrates results of estimating a pose using an LRF according to example embodiments.

FIG. 21 illustrates results of estimating a pose using an LRF according to example embodiments. Referring to FIG. 21, locations of each part with respect to various hand poses may be estimated accurately at a frontal view. FIG. 21 illustrates a portion of pose estimation results using a ground-truth dataset. The ground-truth dataset may be classified based on various views, poses, scales, and shapes.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over a network coupled computer systems so that the software is stored and executed in a distributed fashion. In particular, the software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of training an estimator to estimate a pose of an object, the method comprising:
    obtaining a latent tree model of the object; and
    generating, by way of a processor, a vector pair configured to partition input data received at a latent node into two parts, with respect to a plurality of latent nodes positioned along paths from a root node to a plurality of leaf nodes of the latent tree model, wherein two vectors included in the vector pair are configured to have directions from a center of the input data toward centers of the partitioned two parts.

2. The method of claim 1, wherein the latent tree model comprises a binary tree configured to branch from a center of the object to a plurality of predetermined parts of the object based on a joint structure and a kinematic constraint of the object.

3. The method of claim 1, wherein the generating of the vector pair comprises:
    generating, at random, a plurality of candidate vector pairs based on a center of the input data; and
    selecting a single candidate vector pair that minimizes a variance of candidate vectors in a subset classified by the corresponding candidate vector pair, from among the plurality of candidate vector pairs.

4. The method of claim 3, wherein the generating of the vector pair further comprises iteratively performing the generating at random of the plurality of candidate vector pairs and the selecting until a variance of candidate vectors included in the selected candidate vector pair is less than a threshold value.

5. The method of claim 1, further comprising:
    partitioning a test set into N subsets, N being an integer greater than or equal to "2",
    wherein the generating of the vector pair comprises:
    calculating two candidate vectors configured to partition one of the partitioned subsets into two parts, based on the corresponding subset;
    calculating two offset vectors configured to correct errors of the candidate vectors, based on another of the partitioned subsets; and
    calculating two vectors included in the vector pair based on the two candidate vectors and the two offset vectors.

6. The method of claim 1, wherein the generating comprises:
    generating a split node configured to test a partition of the input data; and
    generating a division node configured to partition the input data, based on an output of the split node.

7. The method of claim 1, wherein the generating of the vector pair comprises:
    generating a split node configured to test a partition of the input data;
    generating an error regression node configured to regress an error of the split node; and
    generating a division node configured to partition the input data, based on outputs of the split node and the error regression node.

8. The method of claim 1, wherein the vector pair comprises candidate vectors each having a variance less than or equal to a predetermined threshold value in a subset classified by the vector pair.

9. The method of claim 1, wherein the input data comprises at least a portion of a depth image in which the object is photographed.

10. The method of claim 1, wherein the root node corresponds to a center of the object, and the plurality of leaf nodes corresponds to the plurality of predetermined parts of the object.

11. A method of estimating a pose, the method comprising:
    detecting a plurality of parts of an object included in an input image using an estimator trained based on a latent tree model of the object; and
    estimating, by way of a processor, a pose of the object based on the detected plurality of parts, wherein the estimator is trained by generating a vector pair configured to partition input data received at a latent node into two parts, with respect to a plurality of latent nodes positioned along paths from a root node to a plurality of leaf nodes of the latent tree model, wherein two vectors included in the vector pair are configured to have directions from a center of the input data toward centers of the partitioned two parts.

12. The method of claim 11, wherein the estimator is configured to receive the input image at a root node included in the latent tree model, partition the input image into two parts at a plurality of latent nodes included in the latent tree model, and output partitioned images corresponding to the plurality of parts at a plurality of leaf nodes included in the latent tree model.

13. The method of claim 11, wherein the latent tree model comprises a binary tree configured to branch from a center of the object to a plurality of predetermined parts of the object based on a joint structure and a kinematic constraint of the object.

14. The method of claim 11, wherein the estimating comprises:

calculating locations of the detected plurality of parts; and
estimating the pose of the object based on the calculated locations.

15. A non-transitory computer-readable storage medium encoded with computer readable code comprising a program for implementing the method of claim 1.

16. A non-transitory computer-readable storage medium encoded with computer readable code comprising a program for implementing the method of claim 11.

* * * * *